US012570400B1

(12) United States Patent
Chantrill et al.

(10) Patent No.: US 12,570,400 B1
(45) Date of Patent: Mar. 10, 2026

(54) LANDING GEAR STRUCTURE AND VENTING FOR VERTICAL TAKE-OFF DUAL-ENGINE AIRCRAFT

(71) Applicant: Anduril Industries, Inc., Costa Mesa, CA (US)

(72) Inventors: Dane Chantrill, Irvine, CA (US); Neil Gupta, Costa Mesa, CA (US); Jeff Lipari, Long Beach, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

(21) Appl. No.: 19/015,414

(22) Filed: Jan. 9, 2025

Related U.S. Application Data

(60) Provisional application No. 63/570,112, filed on Mar. 26, 2024.

(51) Int. Cl.
| | |
|---|---|
| *B64C 29/02* | (2006.01) |
| *B64C 3/32* | (2006.01) |
| *B64C 25/36* | (2006.01) |
| *B64C 25/58* | (2006.01) |
| *B64U 10/20* | (2023.01) |
| *B64U 10/25* | (2023.01) |
| *B64U 20/50* | (2023.01) |

(52) U.S. Cl.
CPC ................ *B64C 29/02* (2013.01); *B64C 3/32* (2013.01); *B64C 25/36* (2013.01); *B64C 25/58* (2013.01); *B64U 10/20* (2023.01); *B64U 10/25* (2023.01); *B64U 20/50* (2023.01)

(58) Field of Classification Search
CPC ......... B64C 29/02; B64C 25/36; B64C 25/58; B64U 10/20; B64U 20/50
See application file for complete search history.

(56) References Cited

U.S. PATENT DOCUMENTS

| | | | |
|---|---|---|---|
| 1,708,373 A | 4/1929 | Weymouth | |
| 1,711,637 A | 5/1929 | Fairchild | |

(Continued)

FOREIGN PATENT DOCUMENTS

| | | |
|---|---|---|
| CN | 105035320 | 11/2015 |
| CN | 106927036 | 7/2017 |

(Continued)

OTHER PUBLICATIONS

International Search Report and Written Opinion in application No. PCT/US2023/079047, mailed on Aug. 13, 2024, in 13 pages.

(Continued)

*Primary Examiner* — Philip J Bonzell
(74) *Attorney, Agent, or Firm* — Knobbe, Martens, Olson & Bear, LLP

(57) ABSTRACT
The present application discloses an aircraft. The aircraft comprises (i) a first wing and a second wing, (ii) a fuselage disposed between the first wing and the second wing, and (iii) a first landing gear system disposed at an aft of the aircraft. The first landing gear system comprises a first leg and a second leg that are configured to at least partially rotate around an axis defined by a length of the first wing when the first leg and the second leg are transitioned to a deployed state or a stowed state. The first landing gear system comprises a first actuation system comprising at least a first actuator and a first shock absorber.

18 Claims, 22 Drawing Sheets

(56) References Cited

U.S. PATENT DOCUMENTS

| | | | | |
|---|---|---|---|---|
| 2,328,786 | A * | 9/1943 | Crowder | B64C 29/02 |
| | | | | 244/17.23 |
| 2,444,781 | A * | 7/1948 | Leonard | B64C 29/02 |
| | | | | 244/7 B |
| 2,479,125 | A * | 8/1949 | Leonard | B64C 29/0075 |
| | | | | 244/102 R |
| 2,572,421 | A | 10/1951 | Abel, Jr. | |
| 2,622,826 | A * | 12/1952 | Prince | B64C 29/02 |
| | | | | 446/37 |
| 2,623,713 | A | 12/1952 | Foster | |
| 2,674,422 | A | 4/1954 | Pellarini | |
| 3,353,862 | A | 11/1967 | Tormolen | |
| 4,215,587 | A | 8/1980 | Kisovec | |
| 4,706,907 | A | 11/1987 | Kopylov | |
| 8,152,100 | B2 | 4/2012 | Nicholas et al. | |
| 9,522,725 | B2 | 12/2016 | Torre | |
| 9,643,720 | B2 | 5/2017 | Hesselbarth | |
| 9,682,774 | B2 | 6/2017 | Paduano et al. | |
| 9,821,909 | B2 | 11/2017 | Moshe | |
| 10,017,278 | B2 * | 7/2018 | Hesse | B64C 25/32 |
| 10,207,621 | B2 | 2/2019 | Friemel et al. | |
| 10,252,798 | B2 | 4/2019 | Petrov | |
| 10,272,999 | B2 * | 4/2019 | Engbersen | B64U 50/13 |
| 10,287,012 | B2 * | 5/2019 | Robertson | B64C 29/02 |
| 10,293,931 | B2 * | 5/2019 | Robertson | B64C 25/10 |
| 10,647,442 | B2 * | 5/2020 | Alber | B64U 30/12 |
| 10,870,487 | B2 | 12/2020 | McCullough et al. | |
| 10,981,661 | B2 | 4/2021 | Oldroyd et al. | |
| 11,027,837 | B2 | 6/2021 | McCullough et al. | |
| 11,104,446 | B2 | 8/2021 | McCullough et al. | |
| 11,161,695 | B1 | 11/2021 | Knight et al. | |
| 11,396,374 | B2 * | 7/2022 | Robertson | B64C 13/503 |
| 11,511,886 | B1 | 11/2022 | Tian | |
| 11,608,173 | B2 | 3/2023 | McCullough et al. | |
| 11,634,232 | B1 | 4/2023 | Weigman | |
| 11,713,114 | B2 | 8/2023 | Schank | |
| 11,794,931 | B2 | 10/2023 | Gil | |
| 11,866,169 | B2 | 1/2024 | Rainville | |
| 12,017,765 | B2 | 6/2024 | Bianco Mengotti et al. | |
| 12,043,364 | B2 | 7/2024 | Braam et al. | |
| 12,172,765 | B2 | 12/2024 | Chantrill et al. | |
| 2010/0276897 | A1 | 11/2010 | Plummer | |
| 2014/0061390 | A1 | 3/2014 | Woodworth et al. | |
| 2016/0025339 | A1 | 1/2016 | Kamath et al. | |
| 2016/0075423 | A1 | 3/2016 | Karem | |
| 2016/0185444 | A1 | 6/2016 | Gionta et al. | |
| 2016/0297520 | A1 | 10/2016 | Sada-Salinas et al. | |
| 2016/0304195 | A1 | 10/2016 | Alber et al. | |
| 2017/0088291 | A1 * | 3/2017 | Hesse | B64C 25/32 |
| 2017/0166306 | A1 * | 6/2017 | Engbersen | B64C 25/52 |
| 2017/0190412 | A1 | 7/2017 | Bunting et al. | |
| 2017/0217598 | A1 | 8/2017 | Bacon et al. | |
| 2017/0327219 | A1 | 11/2017 | Alber | |
| 2018/0002026 | A1 | 1/2018 | Oldroyd et al. | |
| 2018/0022467 | A1 * | 1/2018 | Alber | B64D 35/04 |
| | | | | 244/23 A |
| 2018/0050792 | A1 * | 2/2018 | Robertson | B64C 25/16 |
| 2018/0057160 | A1 * | 3/2018 | Robertson | B64C 25/32 |
| 2018/0079487 | A1 | 3/2018 | Ivans et al. | |
| 2018/0312251 | A1 | 11/2018 | Petrov | |
| 2019/0031334 | A1 | 1/2019 | McCullough et al. | |
| 2019/0135427 | A1 | 5/2019 | Robertson et al. | |
| 2019/0210724 | A1 | 7/2019 | Bublitsky | |
| 2019/0225334 | A1 * | 7/2019 | Robertson | B64C 25/52 |
| 2019/0276129 | A1 | 9/2019 | Morgan | |
| 2020/0062384 | A1 | 2/2020 | McCullough et al. | |
| 2020/0130831 | A1 | 4/2020 | Luca | |
| 2020/0140079 | A1 | 5/2020 | Campbell | |
| 2020/0216255 | A1 | 7/2020 | Sachdev et al. | |
| 2020/0277069 | A1 | 9/2020 | Rainville et al. | |
| 2020/0313209 | A1 | 10/2020 | Rainville et al. | |
| 2021/0061437 | A1 | 3/2021 | Daandels et al. | |
| 2021/0197965 | A1 | 7/2021 | Kunz et al. | |
| 2021/0206456 | A1 | 7/2021 | Werner | |
| 2021/0215518 | A1 | 7/2021 | Rufo et al. | |
| 2021/0309351 | A1 | 10/2021 | Giannini | |
| 2022/0041263 | A1 | 2/2022 | Rainville | |
| 2022/0144421 | A1 | 5/2022 | Rimanelli et al. | |
| 2022/0204152 | A1 | 6/2022 | Campbell | |
| 2022/0227477 | A1 | 7/2022 | Grimm | |
| 2022/0315216 | A1 | 10/2022 | Kaplinsky et al. | |
| 2022/0371728 | A1 | 11/2022 | Hirabayashi et al. | |
| 2023/0025366 | A1 | 1/2023 | Bianco Mengotti et al. | |
| 2023/0348082 | A1 | 11/2023 | Wiegman | |
| 2024/0262489 | A1 | 8/2024 | Keith-Stewart et al. | |
| 2024/0262519 | A1 | 8/2024 | Toland et al. | |
| 2024/0262529 | A1 | 8/2024 | Chantrill et al. | |

FOREIGN PATENT DOCUMENTS

| | | |
|---|---|---|
| CN | 208931638 | 6/2019 |
| CN | 210971492 U | 7/2020 |
| CN | 211442754 U | 9/2020 |
| CN | 211592903 U | 9/2020 |
| CN | 113955092 | 9/2023 |
| EP | 3243747 | 7/2019 |
| JP | 2020-183159 | 11/2020 |
| WO | WO 2023/073710 | 5/2023 |
| WO | WO 2024/167541 | 8/2024 |
| WO | WO 2024/172875 | 8/2024 |

OTHER PUBLICATIONS

International Search Report and Written Opinion in application No. PCT/US2023/079049, mailed on Jan. 22, 2024, in 11 pages.

* cited by examiner

600

630

640

610b

610a

635

612a    612b

602

620b

624b

620a

624a

Deployed

Deployed + Shock
(7.5" max travel shown)

1200

TBD inserts, targeting #10s

1205

1210

Rod end attach

Bracket, 7050

Cap, 7050

1400

1410

1420

1450

Actuator Shaft

Spring / Damper

1425

1415

Coaxial Linear Actuator

Brake

Motor System

1435

1405

1430

1600

LANDING GEAR STRUCTURE AND VENTING FOR VERTICAL TAKE-OFF DUAL-ENGINE AIRCRAFT

CROSS REFERENCE TO OTHER APPLICATIONS

This application claims priority to U.S. Provisional Patent Application No. 63/570,112 entitled LANDING GEAR STRUCTURE AND VENTING FOR VERTICAL TAKE-OFF DUAL-ENGINE AIRCRAFT filed Mar. 26, 2024 which is incorporated herein by reference for all purposes.

BACKGROUND OF THE INVENTION

Fixed wing aircraft generally take flight by travelling horizontally across a runway until the wings of the aircraft are subject to sufficient lift. The requirement of a runway for fixed wing aircraft to take flight restricts the locations from which the aircraft can be deployed. In the case of regional or short-flight aircraft, such as autonomous drones, in order to be deployed at a location far from a source location, such as across a continent or on another continent, the aircraft generally is transported on a larger vessel (e.g., a cargo aircraft or a ship). The use of the larger vessel to transport the aircraft restricts the size of the aircraft (e.g., the fixed wings are subject to dimensional requirements of the larger vessel).

For fixed wing aircraft, deployment of the aircraft requires the aircraft to be assembled on site. Assembly of aircraft is very laborious, thereby restricting the ability for rapid deployment of the fixed-wing aircraft. Further, assembly of the aircraft requires sophisticated operators that have been trained on the design and assembly of the aircraft.

Further, aircraft have a relatively large footprint when in a landed state. However, in certain conditions, the location from which the aircraft is to be deployed may be relatively restricted. Accordingly, it is beneficial to have a design that is space efficient when the aircraft is in a landed state.

BRIEF DESCRIPTION OF THE DRAWINGS

Various embodiments of the invention are disclosed in the following detailed description and the accompanying drawings.

DETAILED DESCRIPTION

Figure 1:
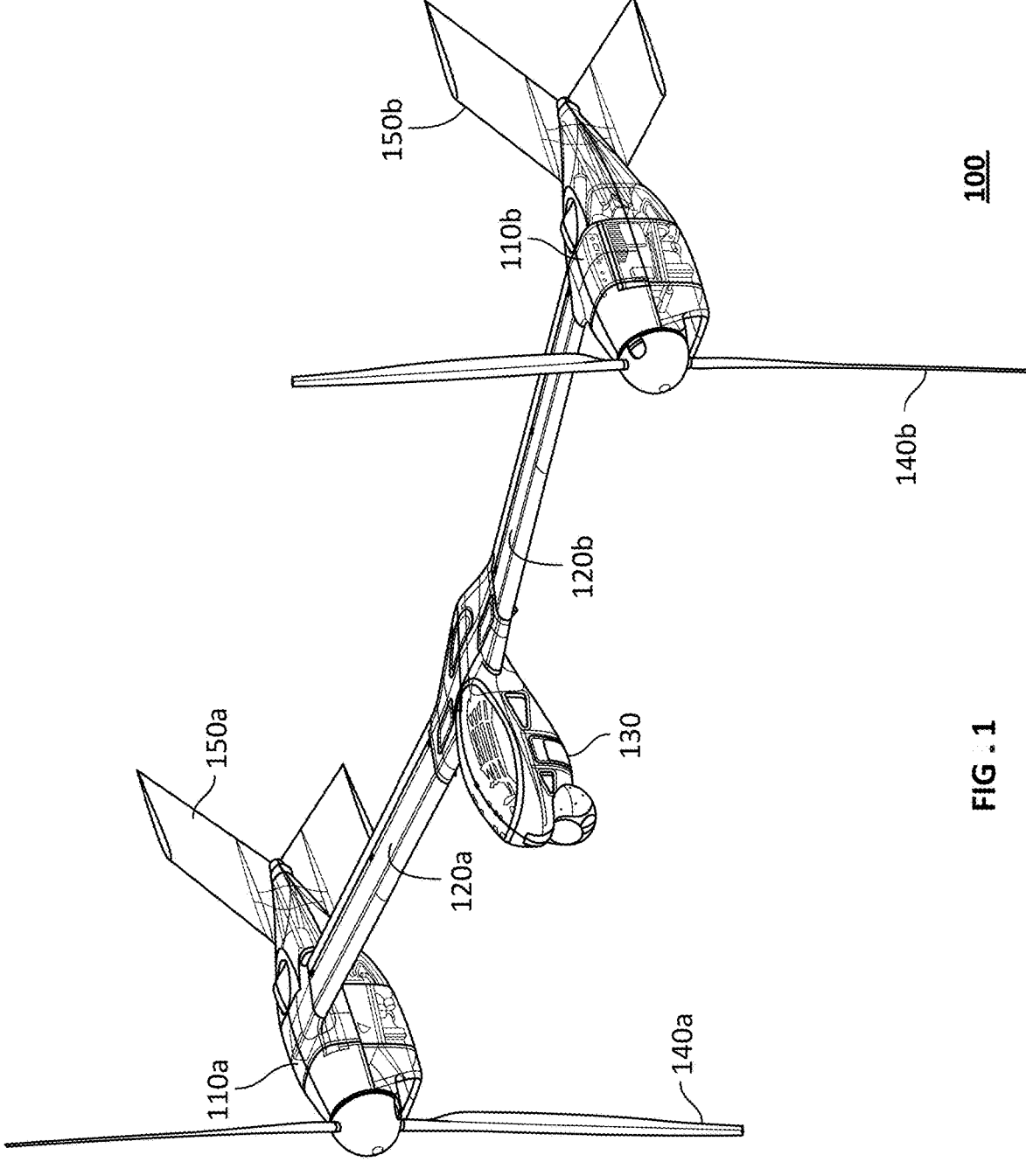
FIG. 1 is a perspective diagram of an aircraft according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments provide an aircraft that is configured to perform 1) a vertical take-off and landing and 2) a horizontal flight. The aircraft (e.g., the aircraft control system) comprises one or more processors and a memory coupled to the one or more processors and configured to provide the one or more processors with instructions. The aircraft is a fixed-wing aircraft that can be stowed (e.g., in a stowed state) and transported in a cargo hold of a vessel. The aircraft may be configured to be assembled/disassembled for transport to a location for deployment.

Various embodiments provide an aircraft. The aircraft may be configured to perform vertical take-off and landing and to perform horizontal flight. The aircraft comprises (i) a first wing and a second wing, (ii) a fuselage disposed between the first wing and the second wing, and (iii) a first landing gear system disposed at an aft of the aircraft. The first landing gear comprises a first leg and a second leg that are configured to at least partially rotate around an axis defined by a length of the first wing when the first leg and the second leg are transitioned to a deployed state or a stowed state.

Various embodiments provide an aircraft. The aircraft comprises (i) a first wing and a second wing, (ii) a fuselage disposed between the first wing and the second wing, and (iii) a first landing gear system disposed at an aft of the aircraft. The first landing gear comprises a first actuation system comprising at least a first actuator and a first shock absorber.

According to various embodiments, the aircraft is configured to be disassembled or collapsed (e.g., to a stowed state) in a manner according to which the collection of aircraft components may fit within a predefined volume. For example, the aircraft may be disassembled/collapsed, such as for transit of the aircraft to a distant location (e.g., another side of a continent, another continent, an island, etc.), and all (or substantially all) components for the aircraft fit within a standard envelope/volume (e.g., a box or pallet). As an example, the standard envelope/volume may be a V-22 cargo envelope. As another example, the predefined volume fits within a cargo bay for a transport vessel. In the case of the transport vessel being a V-22 vehicle, the predefined volume fits within a volume having 5.7-foot width by 5.5-foot height by 20.8 foot length. In some embodiments, the aircraft is designed such that each component fits within dimensional constraints of the envelope/volume (e.g., box or pallet) in which the aircraft is to be stored/transported. In some embodiments, the aircraft is designed so that the first wing, the second wing, the fuselage, the first engine nacelle, and the second engine nacelle fit within the dimensional constraints of the envelope/volume. In some embodiments, the aircraft is designed so that the first wing, the second wing, the fuselage, the first proprotor, the second proprotor, the first engine nacelle, and the second engine nacelle fit within the dimensional constraints of the envelope/volume.

The aircraft may be transported on a cart. The aircraft can be transported in a stowed state (e.g., a state in which the aircraft is at least partially disassembled) and transitioned out of the stowed state (e.g., to a fully assembled state) upon arrival at the location from which the aircraft is to be deployed. The cart may have wheels that facilitate easy loading and unloading from the vessel in which the stowed aircraft is transported, and moving the cart to the desired destination from which the aircraft is to be deployed.

The cart comprises a set of cart members that respectively support certain aircraft components (e.g., support during transport and during the transitioning in or out of the stowed state, etc.) and/or guide the aircraft components to predefined orientations or locations such as for assembly. Examples of the aircraft components include a fuselage, a center wing, a left wing, a right wing, a left nacelle, a right nacelle, etc. Additionally, the cart may include one or more modules in which proprotors are stowed and/or a module that carries fuel to be used to fill the aircraft for deployment. In some embodiments, the cart comprises a set of actuation systems that respectively actuate certain cart members such as in connection with moving or re-orienting (e.g., rotating) the aircraft components.

In some embodiments, the cart comprises a control system. The control system controls the various actuation systems comprised in the cart. For example, the system controls the actuation systems to actuate the corresponding cart members in connection with moving/re-orienting the aircraft components. The control system may control the actuation systems based at least in part on sensor data obtained from sensors comprised in the cart and/or a predefined plan or command input by a user. As an example, the control system controls the actuation systems to automatically move/re-orient the aircraft components to transition the aircraft into or out of a stowed state, such as in connection with assembling or disassembling the aircraft. The control system controls the system to automatically move the aircraft components according to a predefined plan, which may comprise a sequence of steps that are to be performed. As an example, each step includes a set of instructions for actuating one or more cart members to configure the aircraft components.

The cart may comprise a primary controller and a set of secondary controllers. The primary controller is configured to operate the pre-defined plan or respond to user input. For example, the primary controller is configured to: (i) determine a high-level task for assembling a subset of the aircraft and (ii) provide the high-level task to at least one secondary controller in the set of one or more secondary controllers. The secondary controllers are respectively located proximate to their corresponding actuation systems/cart members. For example, a secondary controller that controls actuation of the cart member(s) supporting the fuselage is disposed proximate to the mechanism for actuating the cart member(s).

In some embodiments, the control system (e.g., the primary controller and/or set of secondary controllers) implements a predefined sequence. The control system may store one or more predefined sequences, such as a sequence for transitioning the aircraft out of a stowed state (e.g., in connection with assembly of the aircraft), a sequence for transitioning the aircraft into the stowed state (e.g., in connection with disassembly of the aircraft), a sequence for performing a cart diagnostic, etc. The predefined sequences for transitioning the aircraft into or out of a stowed state may be configured to move the cart member(s) in a sequence and/or timing in a manner that avoids collisions between cart member(s) and/or aircraft component(s). In some embodiments, implementing the predefined sequence includes performing a subset of steps in parallel and a subset of steps in series.

The cart comprises a set of actuation systems that respectively actuate certain cart members to move/re-orient the aircraft components. In some embodiments, the cart comprises at least one actuation system for each axis with respect to which the cart member(s)/aircraft components are to be moved. An actuation system may comprise a power source (e.g., an input that receives power from the cart's main power source), a motor to move a cart member in connection with moving an aircraft component, and a controller configured to actuate (e.g., drive) the motor. Additionally, the actuation system comprises one or more sensors to detect a state of the actuation system and/or cart member. For example, the actuation system may comprise a joint encoder that is configured to measure a joint angle. The joint encoder may be a magnetic encoder, optical coders, etc. The motor may drive a joint screw to cause the cart member to move. Various other types of actuation systems may be implemented, such as a pneumatic system that drives a hydraulic piston, etc.

Related art systems that can perform vertical take-off and landing comprise landing gear mounted to the bottom of the fuselage. Such a landing gear design adds complexity to the design of the fuselage and causes the aircraft to have a larger footprint when landed. For example, in the landed state the aircraft rests horizontally on the landing gear mounted to the bottom of the fuselage. In contrast, various embodiments provide an aircraft having landing gear systems at the aft of the aircraft, such as at the aft of the nacelles, so that the aircraft fuselage is configured in a vertical position when the aircraft is in a landed state.

Accordingly, various embodiments provide an aircraft that is more space efficient (e.g., have a smaller footprint) when in a landed state. Further, various embodiments provide a landing gear system that is less complex than related art systems. For example, according to various embodiments, the landing gear system is a split-leg design and the legs comprised in the landing gear system have a panel design such that the profile of the panels forms the profile of the rear of the nacelle. The panels may be constructed from laminate composites. Further, the panels may have a metallic shell. The landing gear system comprises two v-shaped actuators that are configured to transition the first leg and the second leg to a stowed state or a deployed state.

Figure 2:
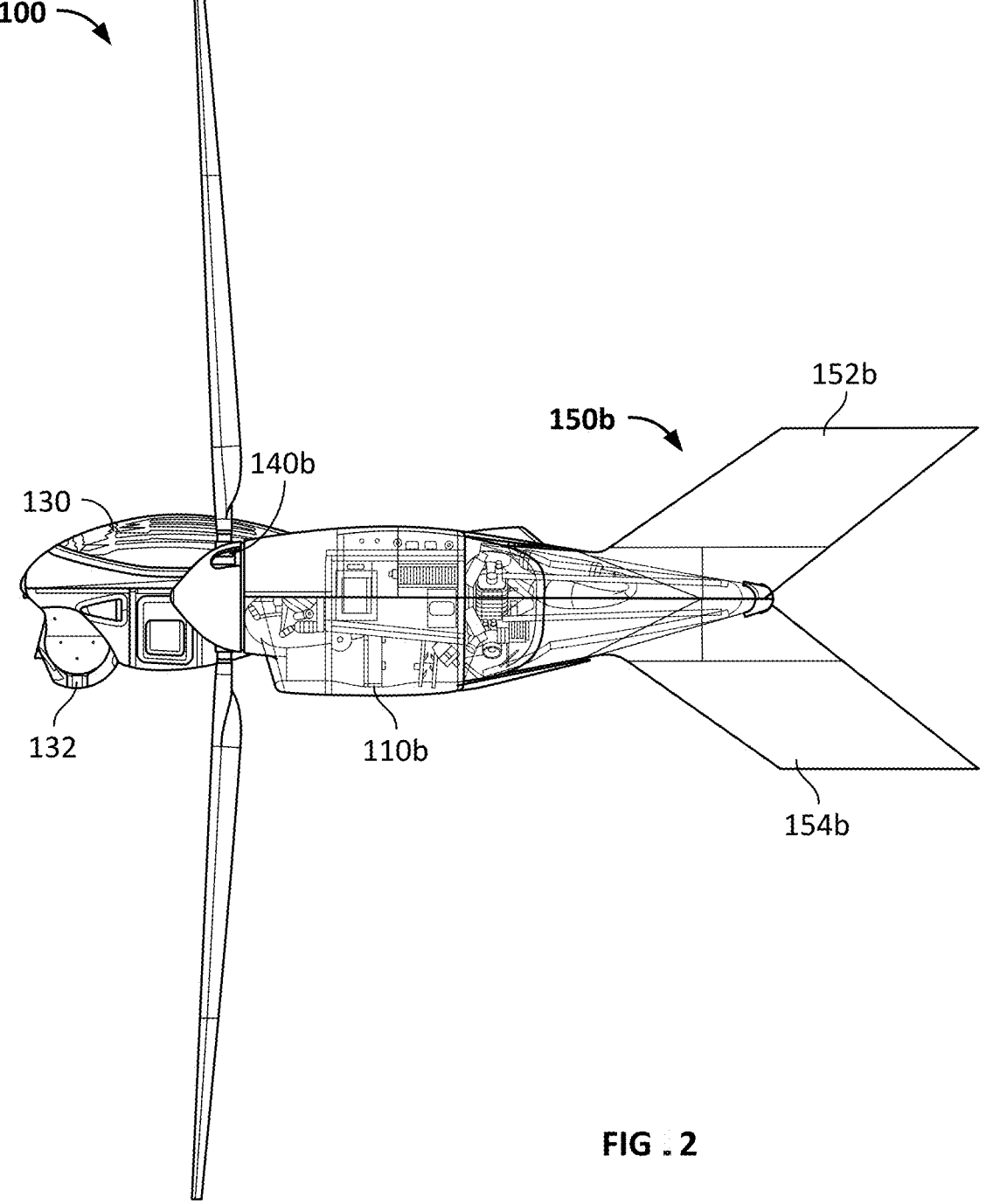
FIG. 2 is a side view diagram of an aircraft according to various embodiments.
Figure 3:
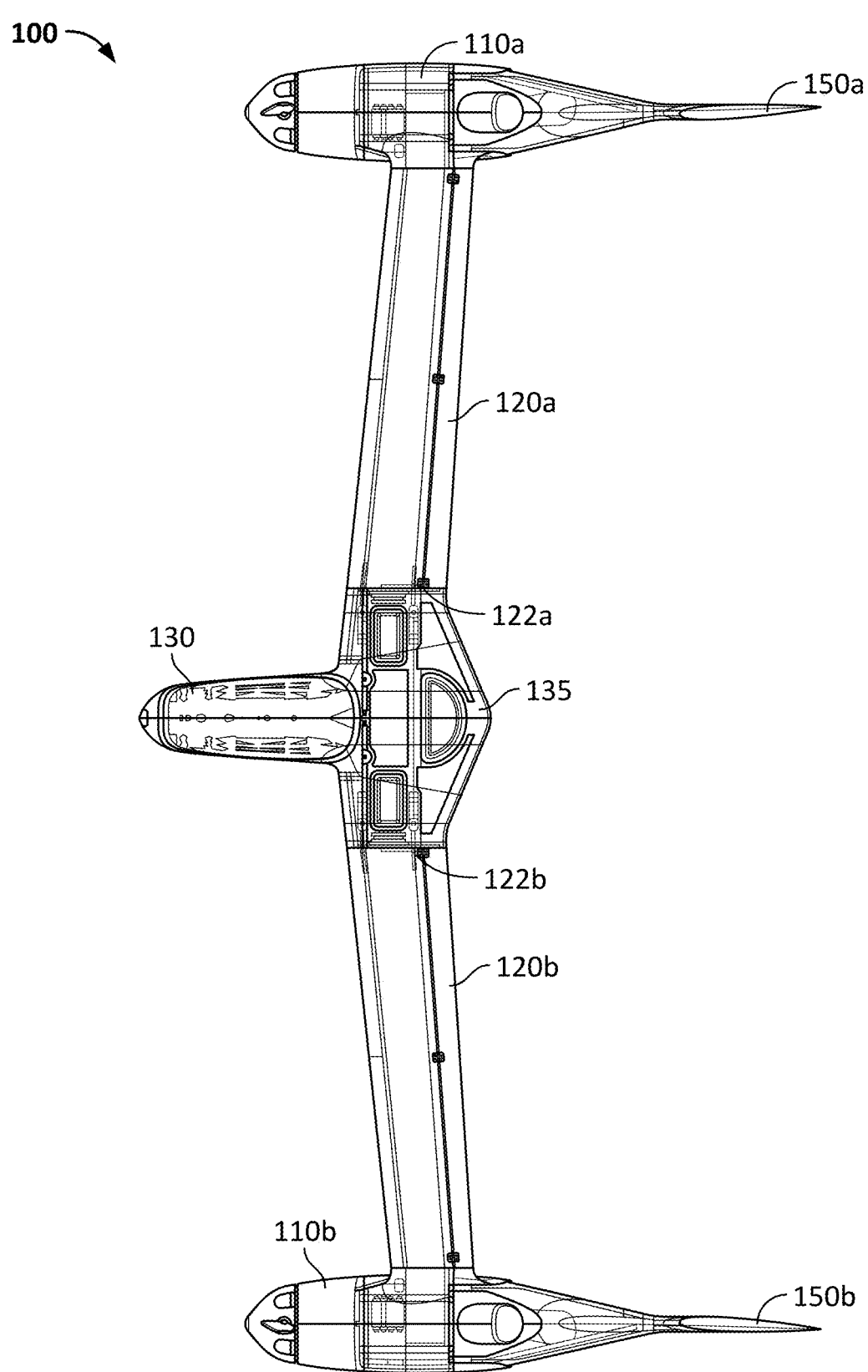
FIG. 3 is a top view diagram of an aircraft according to various embodiments.

FIGS. 1-3 are respectively a perspective, side-view, and top-view diagrams of an aircraft according to various embodiments. As shown in FIG. 1, aircraft 100 comprises fixed wings, first wing 120a and second wing 120b. First wing 120a and second wing 120b are mounted (e.g., fixedly mounted) to fuselage 130. Aircraft 100 further comprises first nacelle 110a and second nacelle 110b comprising propulsion systems that operate to take-off, land, or fly aircraft 100. In some embodiments, aircraft 100 comprises winglets, such as first winglet 150a and second winglet 150b.

In some embodiments, aircraft 100 is configured to vertically take-off and/or land. First nacelle 110a and/or second nacelle 110b may include landing module(s). For example, aircraft 100 rests on a first landing module comprised in first nacelle 110a and a second landing module comprised in second nacelle 110b with the length of fuselage 130 extending vertically. The first landing module and the second landing module may fold into first nacelle 110a and second nacelle 110b, respectively, which allows the landing gear to cause low drag during flight operation. For example, the landing module folds into winglets (e.g., first winglet 150a, second winglet 150b) of first nacelle 110a and second nacelle 110b. As another example, propulsion systems (e.g., first proprotor 140a and second proprotor 140b) are positioned at one end of a nacelle (e.g., first nacelle 110a and second nacelle 110b) and the landing gear is positioned within the tail assembly that includes the winglets (e.g., first winglet 150a and second winglet 150b) at the other end of the tail assembly. In some embodiments, aircraft 100 is enabled to rest on the ground with the proprotors at the top and the landing gear positioned at the bottom/on the ground.

The lengths of first nacelle 110a and second nacelle 110b are constrained by the distance between the end of the nacelle and the ground when the aircraft is facing upwards for take-off/landing. The landing module folds out of first nacelle 110a and second nacelle 110b (e.g., first winglet 150a, second winglet 150b). Accordingly, if the nacelles are too short, the landing modules (e.g., landing gear/landing gear system) may not have sufficient track and thus lead to instability when the vehicle is resting on the landing modules. For example, the track of the landing module should be sufficiently long to ensure that aircraft 100 does not fall over when resting on the landing module (e.g., when aircraft 100 is in a landed state). In addition, the nacelles and/or landing module are configured to have a length to provide sufficient clearance for all payloads that are carried by (e.g., mounted to) aircraft 100.

In some embodiments, the airframe design (e.g., shape of first wing 120a, second wing 120b, first nacelle 110a, and/or second nacelle 110b) is configured to balance performance during vertical take-off/landing and performance during horizontal cruise. For example, the airframe is designed to provide a good (e.g., a stable) transition from vertical take-off mode to horizontal cruise mode (or from horizontal cruise mode to vertical landing mode). Certain components of aircraft 100 may be selected based on stiffness and/or strength required to withstand the forces during vertical take-off and horizontal cruise. For example, the wings, nacelles, or landing gear modules (e.g., the frame or housing around the leg) may comprise composite materials (e.g., fiberglass, Hexply® M77 prepreg, etc.). The airframe further includes clean/mechanical joints between components (e.g., the wing-nacelle interface or wing-fuselage interface), which are also low drag. According to various embodiments, the joints/interfaces between components are designed to optimize (e.g., minimize) drag. Aircraft 100 may comprise a control system that is used to control the distribution/redistribution of fuel to provide appropriate balance of aircraft 100 during operation in different pitches/orientations.

According to various embodiments, aircraft 100 comprises one or more landing modules (e.g., landing gear systems) that cause low drag during flight operation. For example, when the landing gear system is configured in the stowed state, the landing gear system has an aerodynamic (e.g., drag efficient) profile. The aerodynamic profile may be configured based on the shape of a leg or a frame or housing around the leg(s) of the landing gear system.

In some embodiments, the landing gear system comprises a first leg and a second leg. The first leg and the second leg are configured to split apart when the first landing gear is in the deployed state. When configured in the deployed state, the first leg and the second leg are split apart by at least a threshold distance. In some embodiments, the first leg comprises a foot disposed at a distal end of the first leg, and the second leg comprises a wheel disposed at a distal end of the second leg. In some embodiments, the landing gear system comprises two v-shaped actuators that are configured to transition the first leg and the second leg to a stowed state or a deployed state.

In some embodiments, the landing module comprises one or more winglets. For example, in the case that the landing module comprises a panel design with a first landing support member (e.g., a first leg) and a second landing support member (e.g., a second leg), the landing module may comprise a set of winglets configured on (e.g., connected to) one or more of the landing support members.

In some embodiments, the joints between components in aircraft 100 are optimized to balance performance during take-off/flight and support for a quick assembly. For example, various embodiments include wings (e.g., first wing 120*a*, second wing 120*b*) that are hinged with respect to the center wing and/or fuselage 130. In a disassembled state, the wings are folded inwards to form a horseshoe shape with the center wing of fuselage 130. Thus, rapid deployment of aircraft 100 includes unfolding the wings and fixedly mounting the wings to fuselage 130 (e.g., to the center wing of fuselage 130). Although use of folding wings does not optimize aircraft 100 for weight, the folding wings facilitate use of a relatively stiffer/stronger joint for the wings.

First winglet 150*a* and second winglet 150*b* may comprise flight-control (e.g., the control system) or communication components. For example, first winglet 150*a* and/or second winglet 150*b* may be configured to comprise (e.g., mounted on) an antenna such as a vertically polarized antenna.

The propulsion system of aircraft 100 may be a jet engine, a piston engine, a gas turbine, a propeller, or a motor, such as an electric motor. Various other types of propulsion systems may be implemented. In some embodiments, the propulsion system comprises one or more proprotors. In the example shown, aircraft 100 comprises first proprotor 140*a* and second proprotor 140*b*.

In some embodiments, the proprotor (e.g., first proprotor 140*a*, second proprotor 140*b*, etc.) includes one or more blades that are removable. The length of the proprotors (e.g., the proprotor blades) is constrained by the length of the wing. For example, the length of the proprotor blade is less than the length of the wing to provide clearance between fuselage 130 and the proprotor. The one or more proprotors may respectively have at least two blades having a length of at least 5 feet. For example, first proprotor 140*a* comprises two blades having a combined length of 10 feet. The relatively large blades allow aircraft 100 to have a higher cruise speed than aircraft propelled by smaller blades. As an example, the blades are driven by an internal combustion engine (e.g., a heavy fuel internal combustion engine). As another example, the blades are driven by an electric motor. The use of blades for propulsion balances the need to be resilient while taking off vertically and cross winds that may occur during vertical take-off. For example, the proprotors include a two-motor swashplate on each rotor, which facilitates improved stability and resilience to cross winds. In some embodiments, the proprotor blades are mounted to the proprotor in a tool-less integration.

In some embodiments, aircraft 100 is configured to carry a payload. The payload may be mounted to fuselage 130 or the wings (e.g., first wing 120*a* and second wing 120*b*). Examples of payloads include cameras (e.g., electro-optical/infra-red (EO/IR) systems), weapons, packages, etc. Various other payloads may be implemented. Aircraft 100 may comprise one or more sensor mounts or payload mounts to which sensors or payloads are mounted. In the example shown in FIG. 2, aircraft 100 comprises EO/IR system 132 mounted to the chin of fuselage 130.

In some embodiments, aircraft 100 comprises an internal combustion engine. For example, aircraft 100 comprises a first internal combustion engine within first nacelle 110*a* and a second internal combustion engine within second nacelle 110*b*. First nacelle 110*a* and second nacelle 110*b* are detachably mounted to the wings (e.g., first wing 120*a* and second wing 120*b*). During assembly, the nacelles are respectively connected to the wing. The connection between the nacelles and the wings comprises a connection for one or more of fuel lines, communication lines (e.g., signals received via antennae in the winglet), and/or control systems (e.g., wiring for a system computer to control the various operations of aircraft 100, such as driving the engines or actuating the landing modules). In some embodiments, aircraft 100 comprises a fuel reservoir (e.g., a third fuel tank) in fuselage 130. Accordingly, fuel is transferred from fuselage 130 to the engines in the nacelles via fuel connections between the applicable nacelle and fuselage 130 that couple the fuel reservoir to the fuel lines or reservoirs in the wings. In some embodiments, aircraft 100 is able to balance the fuel weight by shifting fuel volume between fuselage 130, first nacelle 110*a*, and second nacelle 110*b*. In some embodiments, aircraft 100 is able to balance the fuel weight by shifting fuel volume between fuselage 130, first wing 120*a*, second wing 120*b*, first nacelle 110*a*, and second nacelle 110*b*.

In some embodiments, the connections between the nacelles and the wings are designed for optimization in assembly/disassembly. For example, aircraft 100 includes a secure and quick connection between the nacelles and the wings. As an example, the one or more connections between the nacelles and the wings (e.g., between first nacelle 110*a* and first wing 120*a*, etc.) comprise a blind mate connection. The connections between the nacelles and the wings may include dry connections for connecting the fuel lines/pathways from the wing to the nacelles (e.g., to the nacelle fuel tanks).

In some embodiments, aircraft 100 comprises fuel reservoirs in the wings and/or nacelles. For example, a first fuel tank is located in first wing 120*a* and a second fuel tank is located in second wing 120*b*. Aircraft 100 may also comprise a fuel reservoir (e.g., the third fuel tank) in fuselage 130. Aircraft 100 comprises a control system (e.g., a computer) that manages delivery of fuel to the engines. The control system controls a use of fuel from the third fuel tank based at least in part on fuel consumption of fuel in the first fuel tank and the second fuel tank. The control system may control the use of fuel from the third fuel tank based on consumption of fuel in the first fuel tank relative to consumption of fuel in the second fuel tank. For example, the control system controls delivery of fuel to ensure that the first fuel tank and the second fuel tank comprise substantially the same amount of fuel (e.g., an amount of fuel within a threshold range). Delivery of the fuel from the third fuel tank to the first fuel tank and the second fuel tank can be used to ensure that aircraft 100 is balanced during flight.

Aircraft 100 comprises one or more landing gear systems. The landing gear system(s) may be disposed at the aft of aircraft 100 (e.g., the aft of the corresponding nacelle). Aircraft 100 uses a control system to control the configuration of the landing gear systems, such as to transition the landing gear module between a stowed state and a deployed state. The landing gear system comprises one or more legs that are sufficiently strong to support the weight of the aircraft when in the deployed state. In some embodiments, the landing gear system comprises an actuator system(s) that actuates the landing module (e.g., one or more landing support members in the landing gear system) to configure the landing module in the stowed state (e.g., a state in which the landing gear is retracted for horizontal flight) or the deployed state (e.g., a state in which the landing gear is deployed for take-off or landing).

In some embodiments, the landing module comprises a mechanism to absorb the shock caused when the aircraft (e.g., the feet at the distal end of the landing support members) engages the land during landing. For example, the landing module comprises a shock absorber that enables one or more of the landing support members to move to change a distance between each other. For example, when a shock is introduced to the landing module, the landing support members move to increase the distance between the landing support members. The landing module (e.g., the actuation system) may comprise a biasing element, such as a spring, which enables the landing support member to retract to lessen the distance between the landing support members (e.g., to normalize or respectively move the landing support members to a neutral state).

Aircraft 100 comprises avionics (e.g., a control system) that control operation of aircraft 100 during fight or take-off/landing. The avionics may be located in fuselage 130 and the mounting/connections for the nacelles to the wings and the wings to the fuselage or central wing (e.g., the fuselage mount) include connections for the avionics to control systems in the wings (e.g., antennae, engines, landing modules, delivery/release of payloads, etc.).

In the examples shown in FIGS. 1 and 2, aircraft 100 comprises second winglet 150b comprised in, or connected to, second nacelle 110b or second wing 120b. Second winglet 150b comprises a second top winglet 152b and a second bottom winglet 154b. The winglets may comprise landing modules that are retracted (e.g., folded) into the winglets during flight and extended during take-off or landing. Fuselage 130 includes EO/IR system 132 and is shown behind second nacelle 110b and is coupled to second wing 120b. Second nacelle 110b has second proprotor 140b.

In the example shown in FIG. 3, fuselage 130 is mounted to center wing 135. Center wing 135 serves as the nucleus of aircraft 100. For example, first wing 120a and second wing 120b are mounted (e.g., hingedly mounted) to center wing 135 via first wing hinge mount 122a and second wing hinge mount 122b. First wing 120a and second wing 120b may be folded relative to center wing 135 to create a horseshoe shape. During assembly, first wing 120a and second wing 120b are unfolded and rigidly mounted/connected to center wing 135. In some embodiments, fuselage 130 is hingedly mounted to center wing 135. For example, fuselage 130 may be folded into the space defined by (e.g., within) the horseshoe shape created by the folding of first wing 120a and second wing 120b relative to center wing 135. First nacelle 110a with first winglet 150a is coupled to first wing 120a at the end opposite being coupled to center wing 135. Second nacelle 110b with second winglet 150b is coupled to second wing 120b at the end opposite being coupled to center wing 135.

In some embodiments, aircraft 100 is configured to have a one-way range of 1000+ nautical miles, has an endurance of at least 10 hours, and is configured to carry a payload of at least 50 lbs. In some embodiments, aircraft 100 has a maximum speed of at least 147 knots.

In various embodiments, aircraft 100 has a wingspan of at least 15 feet, of at least 19 feet, of 18 feet, of 19 feet, or any other appropriate minimum length, length, or maximum length.

Figure 4:
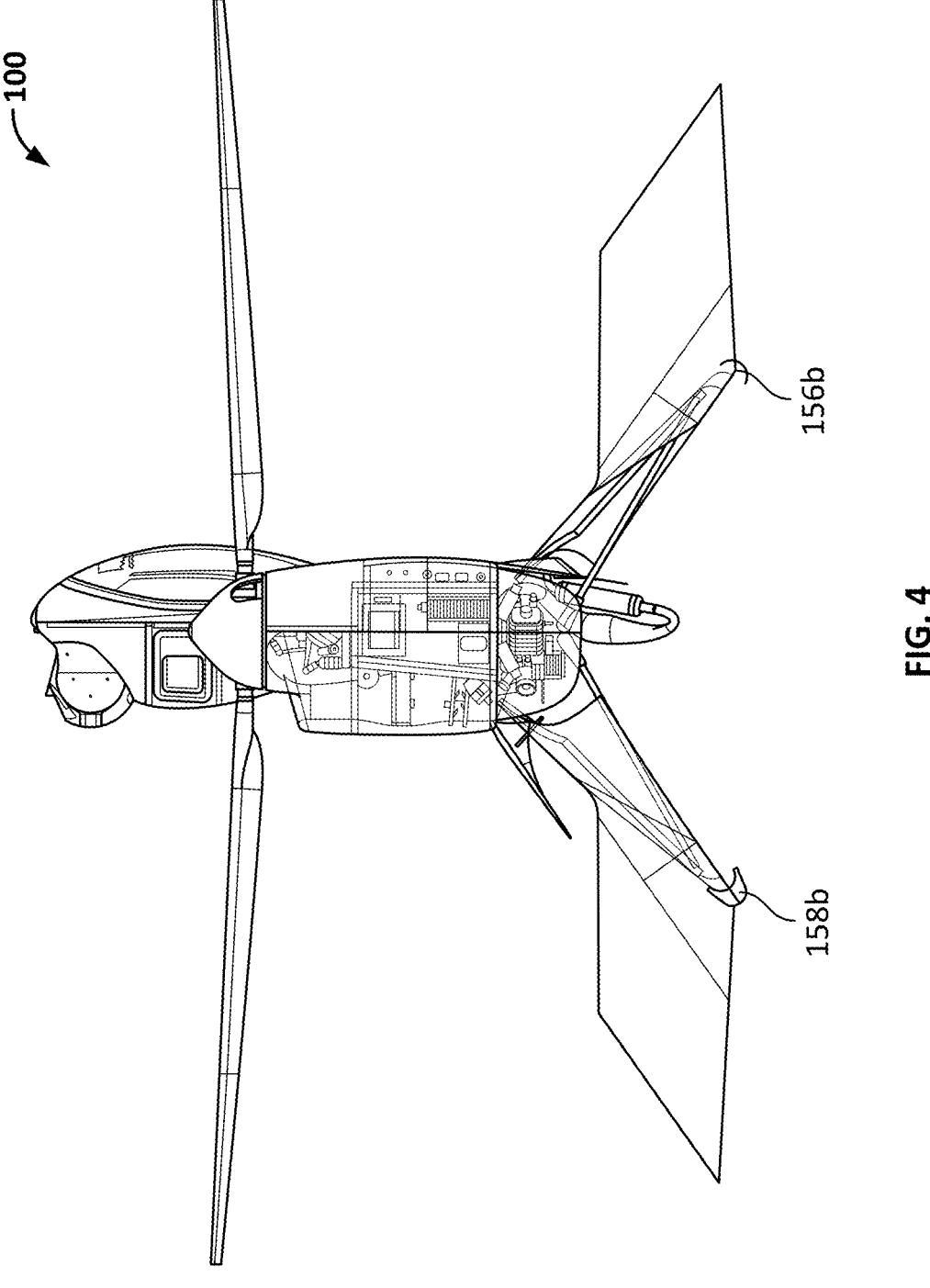
FIG. 4 is a side view diagram of an aircraft in a take-off state according to various embodiments.

FIG. 2 and FIG. 4 are side view diagrams of an aircraft in a horizontal flying state and a vertical take-off state according to various embodiments. In some embodiments, aircraft 100 comprises a low-drag and lightweight landing module that may be extended during take-off or landing, as illustrated in FIG. 4.

In the example shown in FIG. 2 and FIG. 4, the landing module of first wing 120a (e.g., connected to first nacelle 110a or a first top winglet or a first bottom winglet) comprises first landing support member (not shown), such as a first leg, and second landing support member (not shown), such as a second leg. Similarly, the landing module of second wing 120b (e.g., connected to second nacelle 110b or second top winglet 152b or second bottom winglet 154b)

comprises third landing support member 156b and fourth landing support member 158b. As illustrated, the first landing support member and the second landing support member provide a wide stance when aircraft 100 is landed. For example, the first landing support member and the second landing support member comprise a panel design. The panels may be retracted during flight to ensure efficient drag management (e.g., a first landing support member and a second landing support member when in the retracted position—for example, a closed clam shell configuration—contribute low drag to aircraft 100). The set of panels of the landing support members in the landing module are profiled such that an aggregate profile of the panels when the landing support members are configured in the stowed state is aerodynamic. As illustrated, third landing support member 156b and fourth landing support member 158b provide a wide stance when aircraft 100 is landed. For example, third landing support member 156b and fourth landing support member 158b comprise a panel design. The panels may be retracted (e.g., configured in a stowed state) during flight to ensure efficient drag management (e.g., third landing support member 156b and fourth landing support member 158b when in the retracted position—for example, a closed clam shell configuration—contribute low drag to aircraft 100).

In some embodiments, the landing module is configured to be relatively expeditionary, such as to provide aircraft 100 with the ability to land/take-off on uneven terrain, odd ground surfaces, or otherwise challenging terrain. For example, a first landing support member and second landing support member and/or third landing support member 156b and fourth landing support member 158b may be shaped to provide support on uneven or inclined ground surfaces.

FIG. 4 is a side view diagram of an aircraft in a take-off state according to various embodiments. In some embodiments, aircraft 100 comprises a low-drag and lightweight landing module that may be extended during take-off or landing, as illustrated in FIG. 4.

The landing module of first wing (e.g., first wing 120a of FIG. 1 connected to first nacelle 110a or first top winglet or first bottom winglet) comprises a first landing support member and a second landing support member. Similarly, in the example shown in FIG. 4, the landing module of second wing (e.g., second wing 120b of FIG. 1 connected to second nacelle 110b or second top winglet 152b or second bottom winglet 154b) comprises third landing support member 156b and fourth landing support member 158b. As illustrated, third landing support member 156b and fourth landing support member 158b provide a wide stance when aircraft 100 is landed. For example, third landing support member 156b and fourth landing support member 158b comprise a panel design. The panels may be retracted during flight to ensure efficient drag management (e.g., third landing support member 156b and fourth landing support member 158b when in the retracted position—for example, a closed clam shell configuration—contribute low drag to aircraft 100).

In some embodiments, the landing module is configured to be relatively expeditionary, such as to provide aircraft 100 with the ability to land/take-off on uneven terrain, odd ground surfaces, or otherwise challenging terrain. For example, the first landing support member and the second landing support member and/or third landing support member 156b and fourth landing support member 158b may be shaped to provide support on uneven or inclined ground surfaces.

Figure 8A:
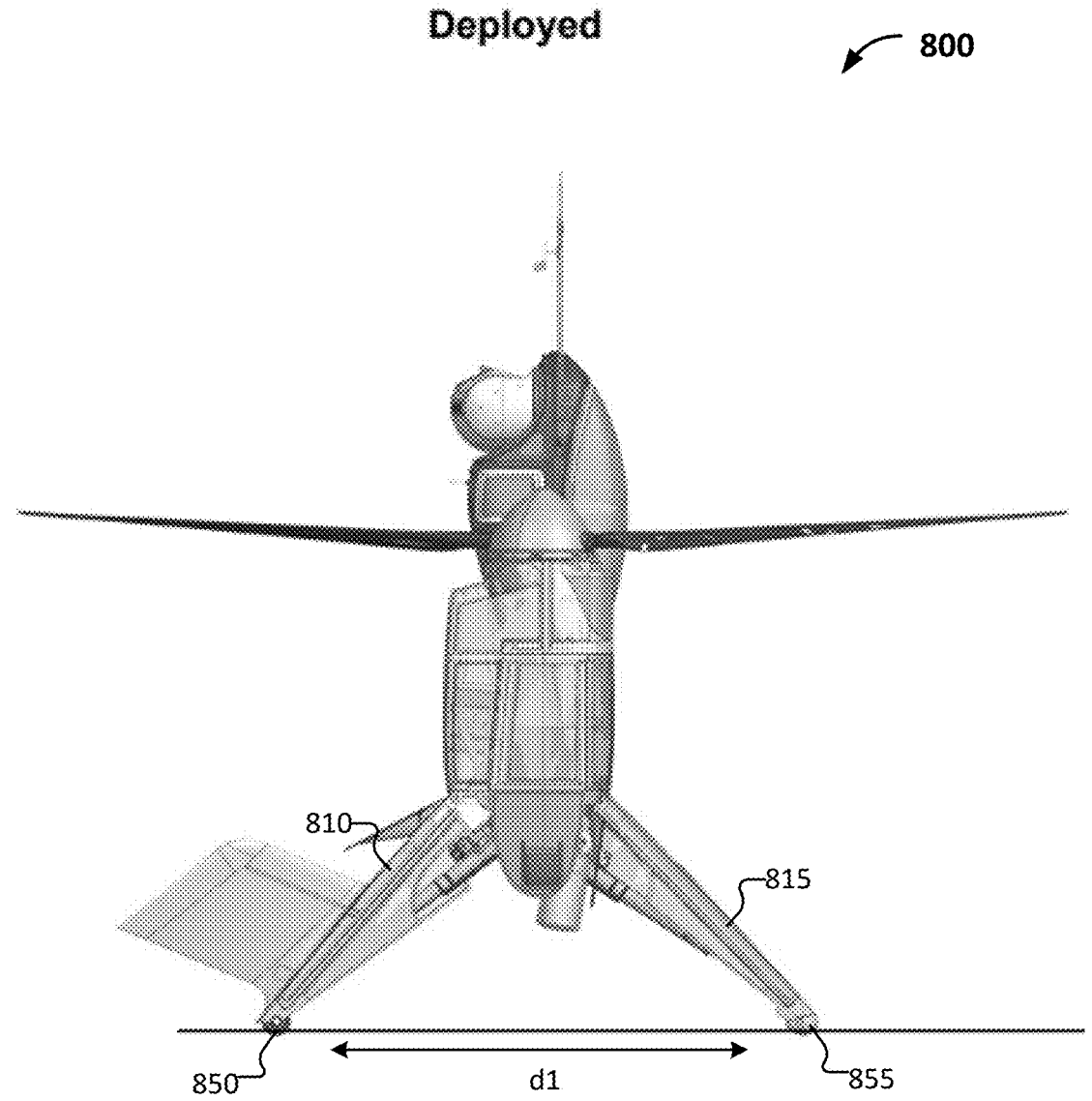
FIG. 8A is a diagram of a landing gear system configured in a deployed state according to various embodiments.

Although the example shown in FIG. 4 illustrates a landing module with a panel design, various other landing modules may be implemented. An example of a landing module is one formed using the rear of the nacelle and a blade or other member that extends from a retracted state to provide a substantially wide stance between the blade and the rear of the nacelle. An example of a landing module is illustrated in FIG. 8A in which the landing module includes a support member extending from the wing tail on the nacelle (e.g., in a direction towards the rear of the aircraft) and either a rear surface of the nacelle or a member extending from the rear of the nacelle.

Figure 5A:
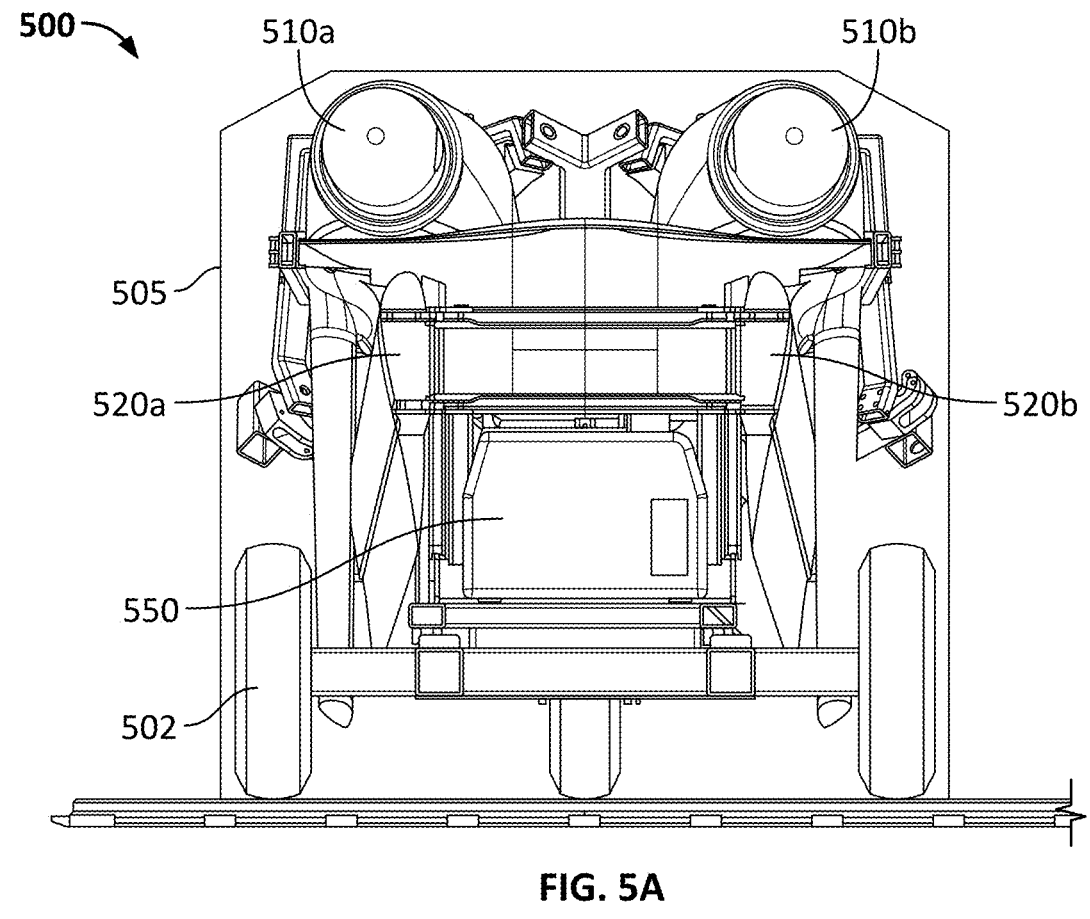
FIG. 5A is a front view of an aircraft in a disassembled state according to various embodiments.
Figure 5B:
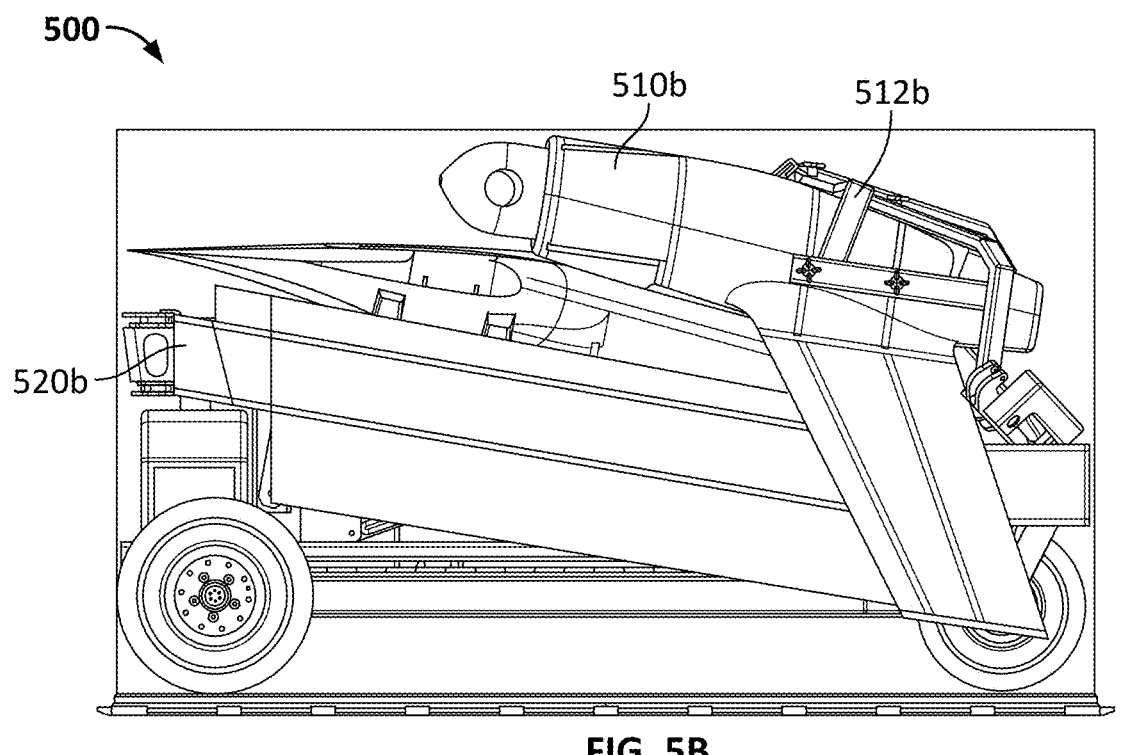
FIG. 5B is a side view of an aircraft in a disassembled state according to various embodiments.

FIGS. 5A and 5B are front view and side view diagrams of an aircraft in a disassembled state according to various embodiments. In the example shown, aircraft 500 is configured in a disassembled state (also referred to herein as a stowed state). The components for aircraft 500 are carried on cart 502. In some embodiments, the components collectively fit within envelope 505. As an example, dimensions of envelope 505 may be determined based on, or constrained by, dimensions of a cargo hold of a vessel in which aircraft 500 is to be transported.

As illustrated in FIGS. 5A and 5B, first nacelle 510a and second nacelle 510b are respectively detached from first wing 520a and second wing 520b and are placed/mounted on a nacelle support member (e.g., second nacelle support member 512b) of cart 502. In the disassembled state, first wing 520a and second wing 520b are folded around the center wing. First wing 520a, second wing 520b, and center wing may be respectively mounted/supported by support members of cart 502. The fuselage is folded from the center wing such that the fuselage occupies the space between the folded first wing 520a and the second wing 520b. During assembly, first nacelle 510a is connected to first wing 520a via a first nacelle support member on first wing 520a. Similarly, second nacelle 510b is connected to second wing 520b via a second nacelle support member on second wing 520b. As an example, the nacelle support members on the wings are inserted into the corresponding nacelles, and the nacelles are mounted (e.g., bolted) to the wings.

In some embodiments, cart 502 comprises (e.g., supports) generator 550 for supplying electrical power. In some embodiments, a separate fuel tank (not shown in FIG. 5A or FIG. 5B) is used to supply aircraft 500 with fuel during assembly. In some embodiments, the fuel is pumped from the separate fuel tank to the fuselage fuel tank, to a first nacelle fuel tank, and/or to a second nacelle fuel tank. In some embodiments, cart 502 includes a fuel pump and a hose with connector/valve for interfacing with a fuel inlet for the fuselage, the first nacelle, and/or the second nacelle.

In some embodiments, cart 502 comprises support members that are controlled via motor or hydraulic piston to lift heavy components during assembly/disassembly. The hydraulic/motor support ensures that aircraft 500 is quickly assembled/disassembled and with fewer resources (e.g., human operators or other support equipment, such as a portable crane, etc.). In some embodiments, the time from drop shipment to take-off is within 30 minutes. In some embodiments, aircraft 500 can be assembled in about 10 minutes.

As illustrated in FIGS. 5A and 5B, aircraft 500 (in a disassembled state) is relatively compact relative to dimensions of the expanded aircraft 500 (e.g., in an assembled state).

According to various embodiments, the aircraft is designed to include interfaces between components that balance minimizing drag (e.g., having drag contributions less than a predefined draft threshold) and facilitating quick and easy assembly/disassembly. In some embodiments, certain components are mounted via a hinge so that assembly/ disassembly includes merely manipulating an interface bolt and rotating the component to transition between a disassembled state and an assembled state.

Figure 6A:
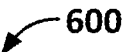
FIG. 6A is a diagram of an embodiment of an aircraft in a disassembled state.
Figure 6A:
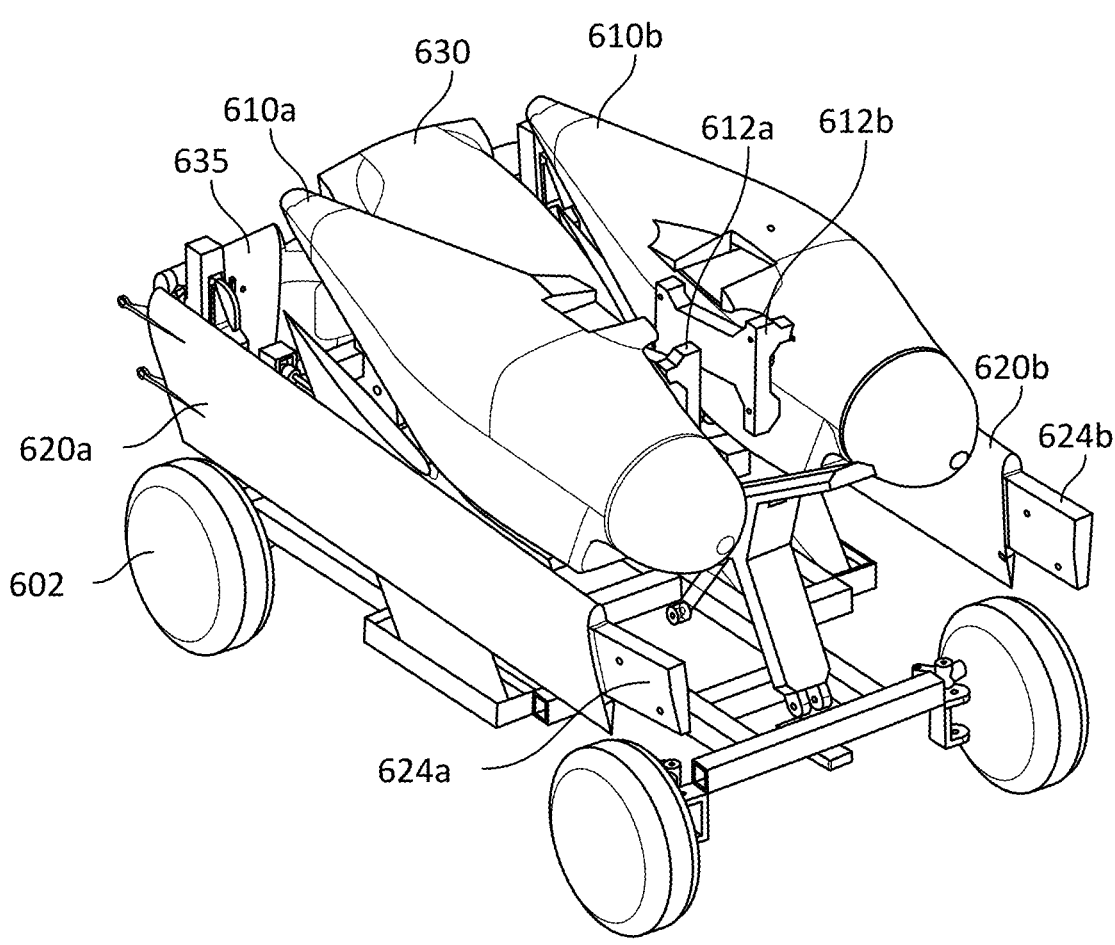

FIG. 6A is a diagram of an embodiment of an aircraft in a disassembled state. In the example shown, first nacelle 610a and second nacelle 610b are respectively detached from first wing 620a and second wing 620b and are placed/mounted on a nacelle support member (e.g., first nacelle support member 612a and second nacelle support member 612b) of cart 602. In the disassembled state, first wing 620a and second wing 620b are folded around center wing 635. First wing 620a, second wing 620b, and center wing 635 may be respectively mounted/supported by support members of cart 602. Fuselage 630 is folded from center wing 635 such that the fuselage occupies the space between the folded first wing 620a and the second wing 620b. During assembly, first nacelle 610a is connected to first wing 620a via first nacelle support member 624a on first wing 620a. Similarly, second nacelle 610b is connected to second wing 620b via second nacelle support member 624b on second wing 620b. As an example, the nacelle support members on the wings are inserted into the corresponding nacelles, and the nacelles are mounted (e.g., bolted) to the wings.

In some embodiments, cart 602 comprises support members that are controlled via motor or hydraulic piston to lift heavy components during assembly/disassembly. The hydraulic/motor support ensures that aircraft 600 is quickly assembled/disassembled and with less resources (e.g., human operators or other support equipment, such as a portable crane, etc.). In some embodiments, the time from drop shipment to take-off is within 30 minutes. Aircraft 600 can be assembled in about 10 minutes.

As illustrated in FIG. 6A, aircraft 600 in a disassembled state is relatively compact relative to dimensions of the expanded aircraft 600 (e.g., in an assembled state).

According to various embodiments, the aircraft is designed to include interfaces between components that balance minimizing drag (e.g., have drag contributions less than a predefined draft threshold) and facilitating quick and easy assembly/disassembly. In some embodiments, certain components are mounted via a hinge so that assembly/disassembly includes merely manipulating an interface bolt and rotating the component to transition between a disassembled state and an assembled state.

In some embodiments, the fuel system includes connections (e.g., dry break connections that allow flow when connected and do not allow flow when not connected) that do not allow fuel to drain from the fuselage fuel tank, the first nacelle fuel tank, and/or the second nacelle fuel tank in the event that the aircraft is in a dissembled state with the fuel connections between the fuselage fuel tank, the first nacelle fuel tank, and/or the second nacelle fuel tank being not connected.

Figure 6B:
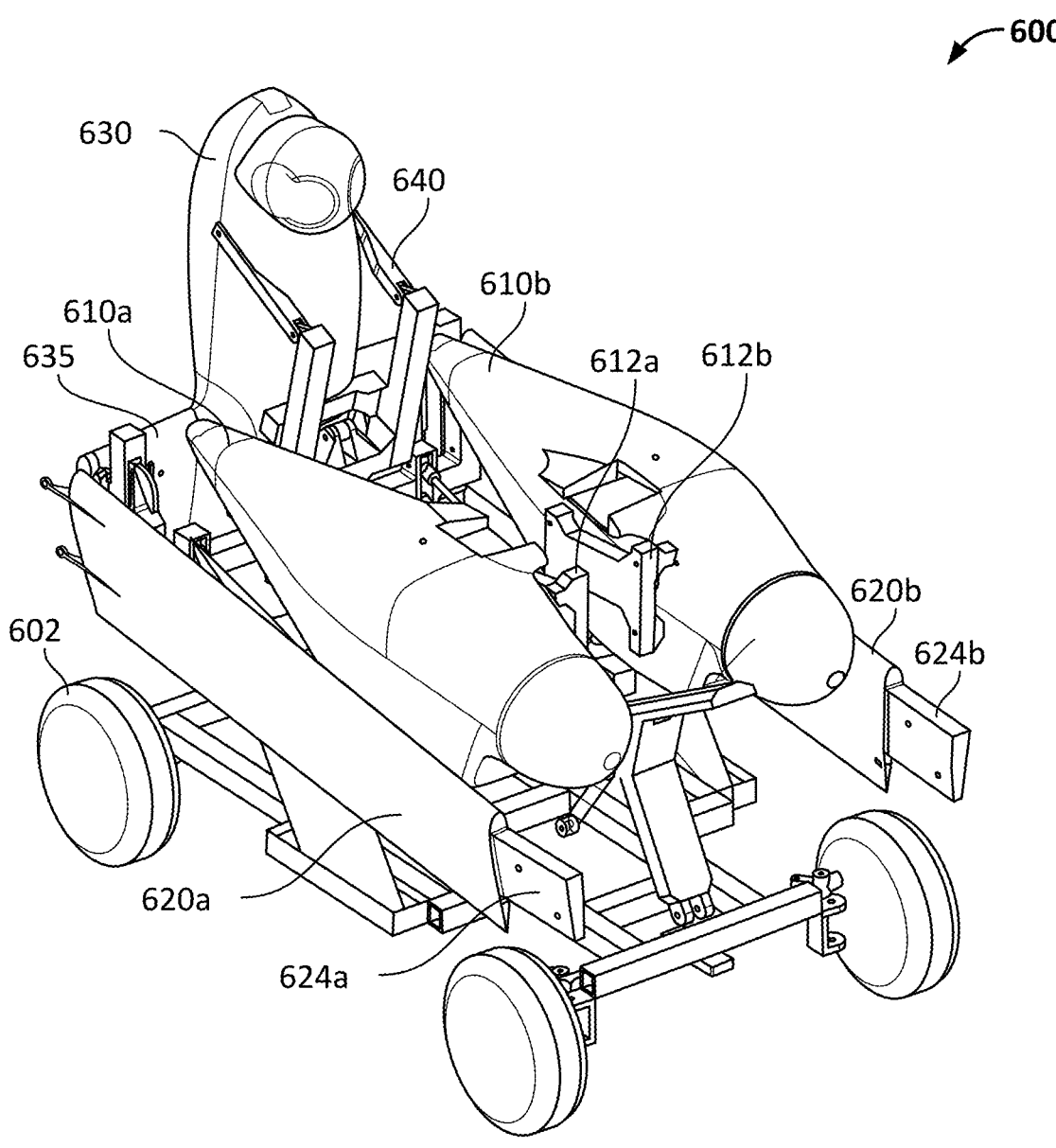
FIG. 6B is a perspective view of an aircraft in a disassembled state according to various embodiments.
Figure 6C:
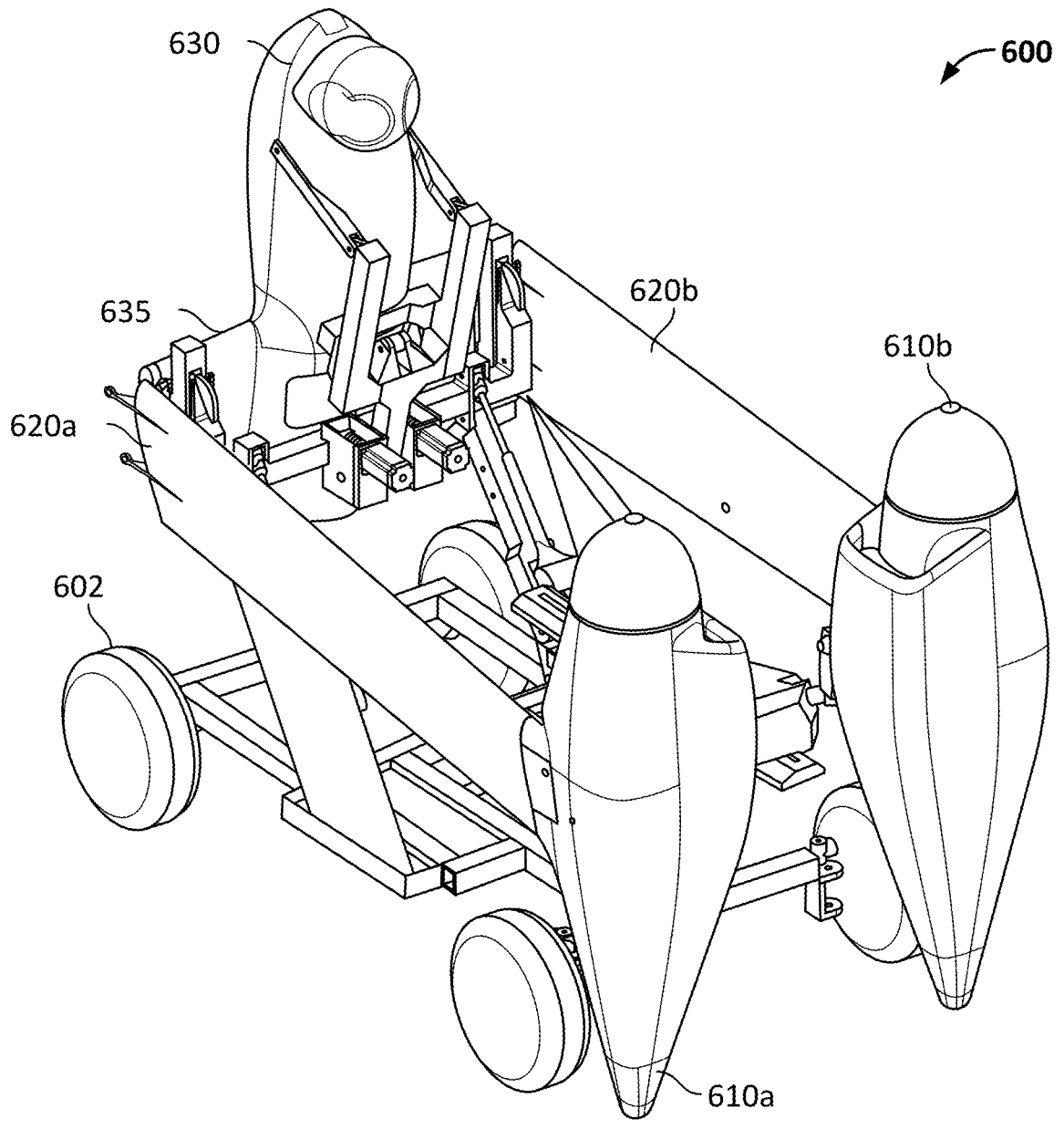
FIG. 6C is a perspective view of an aircraft in a partially assembled state according to various embodiments.

FIG. 6B and FIG. 6C are perspective views of an aircraft in a disassembled state and a partially assembled state according to various embodiments. In the examples shown in FIG. 6B of a state of aircraft 600, fuselage 630 is shown rotated upwards (e.g., using a hinge of cart 602 to pivot fuselage 630 which is moved using support member 640 to a fuselage assembled state where fuselage 630 is coupled to center wing 635). Fuselage 630 is transitioned from a disassembled state in which fuselage 630 rests in the space defined by folded first wing 620a and second wing 620b to an assembled state in which fuselage 630 engages with center wing 635 and extends substantially vertically from the ground. In some embodiments, assembly of fuselage 630 includes rotating fuselage around an axis defined by a hinge mount that connects fuselage 630 and center wing 635. In response to fuselage 630 being rotated upwards and transitioned to an assembled state, fuselage 630 is fixedly mounted to center wing 635, such as by inserting/tightening interface bolts. In some embodiments, first nacelle 610*a* and second nacelle 610*b* are respectively mounted on a nacelle support member (e.g., first nacelle support member 612*a* and second nacelle support member 612*b* in region 611) to cart 602.

In the example shown in FIG. 6C, first wing 620*a* and second wing 620*b* are moved (e.g., raised using actuators in region 642 and region 644) to align nacelle support members 624*a*, 624*b* with first nacelle 610*a* and second nacelle 610*b*, respectively. In some embodiments, moving first wing 620*a* and second wing 620*b* for alignment includes raising fuselage 630 and/or center wing 635, such as by actuating movement of support member 640. As fuselage 630 and center wing 635 are moved, first wing 620*a* and second wing 620*b* are moved in turn.

Figure 6D:
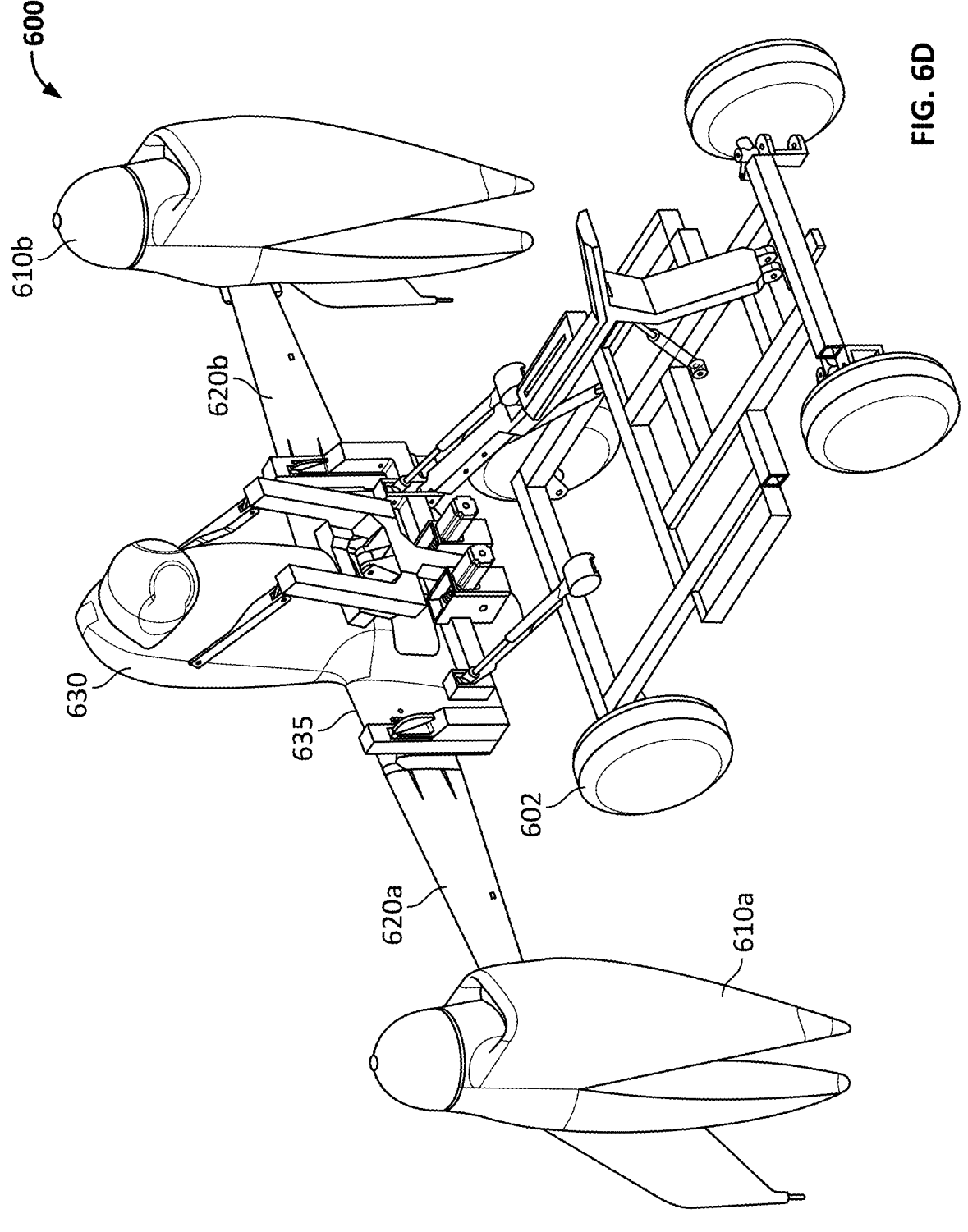
FIG. 6D is a perspective view of an aircraft in a partially assembled state according to various embodiments.

FIG. 6D is a perspective view of an aircraft in a partially assembled state according to various embodiments. In the example shown in FIG. 6D of a state of aircraft 600, the wings are extended for fixedly mounting the wings to the center wing. In response to the nacelles (e.g., first nacelle 610*a* and second nacelle 610*b*) being fixedly mounted to the wings (e.g., first wing 620*a* and second wing 620*b*), the wings are moved to the position at which the wings are to be fixed to center wing 635. In some embodiments, the wings are respectively connected to center wing 635 via hinges. Accordingly, the wings are rotated around the axes respectively defined by the hinges until the wings are level (or substantially level) with center wing 635. Mounting the wings to center wing 635 may include configuring an attachment mechanism, such as an interface bolt, to fixedly mount the wings to the center wing. In some embodiments, the winglets (e.g., winglet 615) are attached using a ball spring pin and/or a spring-loaded locking pin. Actuator 648 in area 647 and actuator 646 in area 645 are used to elevate aircraft 600 as part of an assembly sequence.

Figure 7:
FIG. 7 is a diagram of a landing gear system for an aircraft according to various embodiments.

FIG. 7 is a diagram of a landing gear system for an aircraft according to various embodiments. In the example shown, aircraft 700 comprises center wing 710, fuselage 705, and right wing 715 and left wing 720 respectively mounted to center wing 710. Each of the wings may have a nacelle configured/mounted on its distal end. For example, left nacelle 725 is mounted to left wing 720.

In some embodiments, aircraft 700 comprises one or more landing gear systems disposed at its rear/aft. In the example shown, aircraft 700 comprises landing gear system 730 at the rear of left nacelle 725. Aircraft 700 may also comprise a landing gear system (not shown) at the rear of a right nacelle (not shown) mounted to right wing 715.

Landing gear system 730 is illustrated in its stowed state. As shown, while in the stowed state, landing gear system 730 has a profile that is aerodynamic to support low drag during horizontal flight. Landing gear system 730 comprises an actuation system that is configured to transition landing gear system 730 between a stowed state (e.g., a state for horizontal flight) and a deployed state (e.g., a state for take-off and landing).

In some embodiments, the landing module of landing gear system 730 has a panel design according to which a plurality of landing support members (e.g., a first landing support member and a second landing support member) are actuated to transition between a stowed state and a deployed state. In the stowed state, as illustrated in FIG. 7, the landing support members are retracted or stowed in a manner to give landing gear system 730 an aerodynamic profile during flight. In the deployed state, the landing support members are extended (e.g., rotated around an axis parallel to the length of the wings—for example, right wing 715 or left wing 720). The landing support members are extended sufficient to provide a predefined length between the landing support members. The landing gear system 730 may comprise one or more winglets attached to the landing support members (e.g., attached to the panels).

Figure 8B:
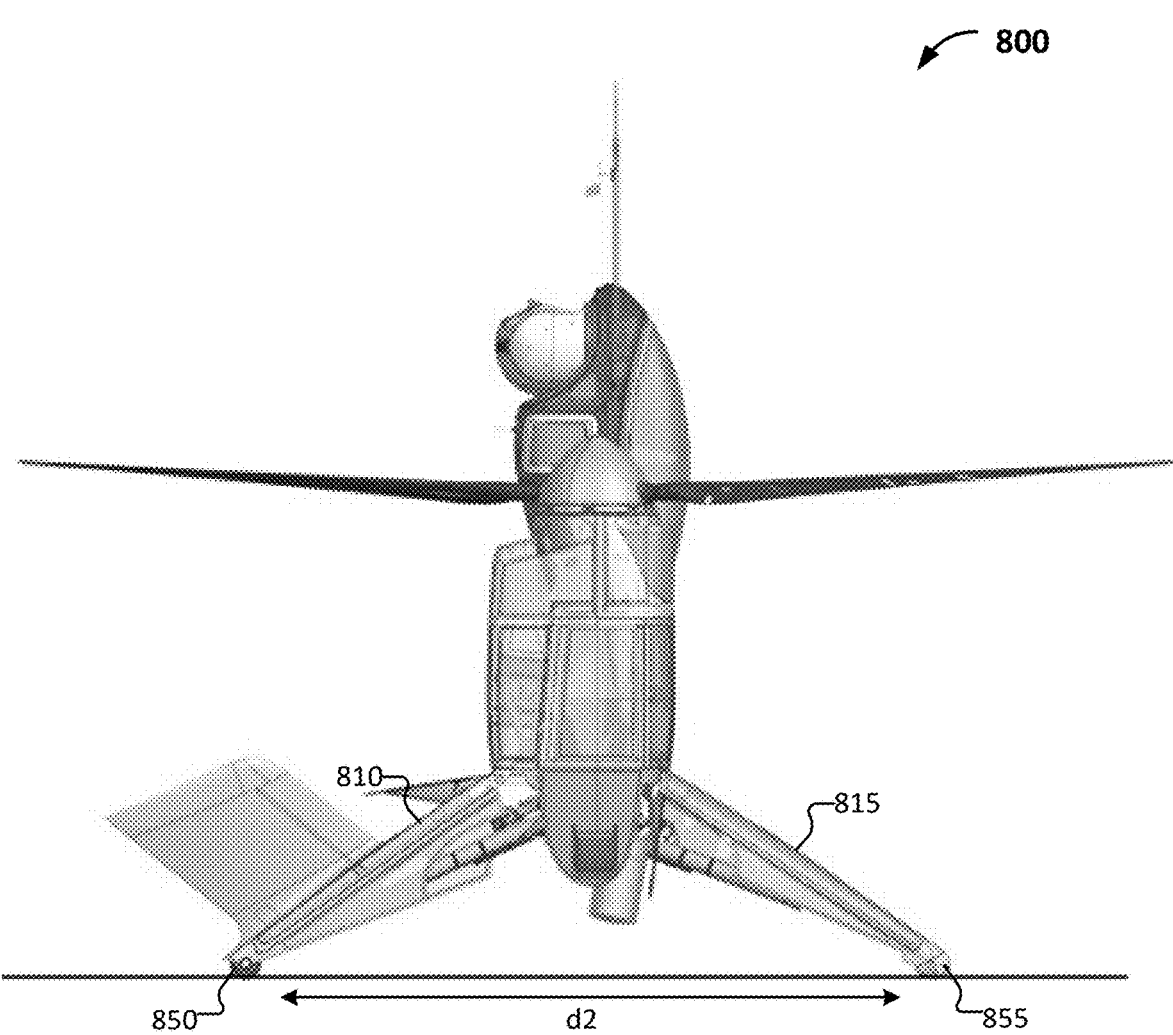
FIG. 8B is a diagram of a landing gear system in a deployed state during landing according to various embodiments.

FIGS. 8A and 8B are diagrams of a landing gear system configured in a deployed state according to various embodiments. In some embodiments, the landing gear system comprises a mechanism to absorb the shock created when the aircraft engages the land during a landing operation. The landing gear system may comprise a mechanism to allow one or more of the landing gear modules to move in a manner that changes the distance between the landing gear module, such as to allow a landing support member to absorb the shock created during landing. The mechanism may comprise one or more of an actuation system, a spring, a damper, and a wheel.

In the example shown, aircraft 800 comprises first landing support member 810 and second landing support member 815. The landing support members have feet (e.g., foot 850 and foot 855) at their respective distal ends. The feet may be attached to the distal ends of the landing support members to enable replacement of the feet as a result of wear and tear. In some embodiments, one or more of the feet are configured to have a relatively low friction that prohibits the foot to slide/travel across the ground. For example, one or more of the feet comprises a wheel that allows the landing support member to extend and retract as aircraft 800 endures and dampens a shock during landing. In the example shown, foot 850 comprises a wheel, and foot 855 is a static or rigid structure to support landing support member 815 and at least part of aircraft 800.

As illustrated in FIG. 8A, in the deployed state, first landing support member 810 and second landing support member 815 have distal ends (e.g., feet) that are spaced a distance d1 apart. In some embodiments, distance d1 is the distance between the landing support members (e.g., the feet thereof) when aircraft 800 is in a landed state.

As illustrated in FIG. 8B, in the deployed state during landing, aircraft 800 endures shock from the engagement between aircraft 800 and the ground. In some embodiments, one or more of the landing support members have a shock absorber mechanism, such as a mechanism that enables a landing support member(s) to translate the corresponding foot along the ground surface to increase the distance between first landing support member 810 and second landing support member 815; and as the shock is absorbed and dampened to travel along the ground surface to decrease the distance between first landing support member 810 and second landing support member 815. In the example shown, one or more of first landing support member 810 and second landing support member 815 is configured to enable the distance between first landing support member 810 and second landing support member 815 to travel to a maximum distance d2 when aircraft 800 is enduring shock during landing. The landing gear system may comprise a damper that dampens the force on one or more of first landing support member 810 and second landing support member 815. The landing gear system may comprise one or more biasing elements (e.g., a spring) to bias positioning of at least one of the landing support members so the distance between the landing support members 810, 815 corresponds to distance d1 for the normal positioning and operation of the landing gear system in a deployed state.

In some embodiments, the landing gear system is configured to allow a maximum travel distance (e.g., distance d2 minus distance d1) of less than 10 inches to be traveled collectively by landing support members 810, 815. For example, the maximum travel distance is between seven and eight inches. As another example, the maximum travel distance is seven and a half inches.

Figure 8C:
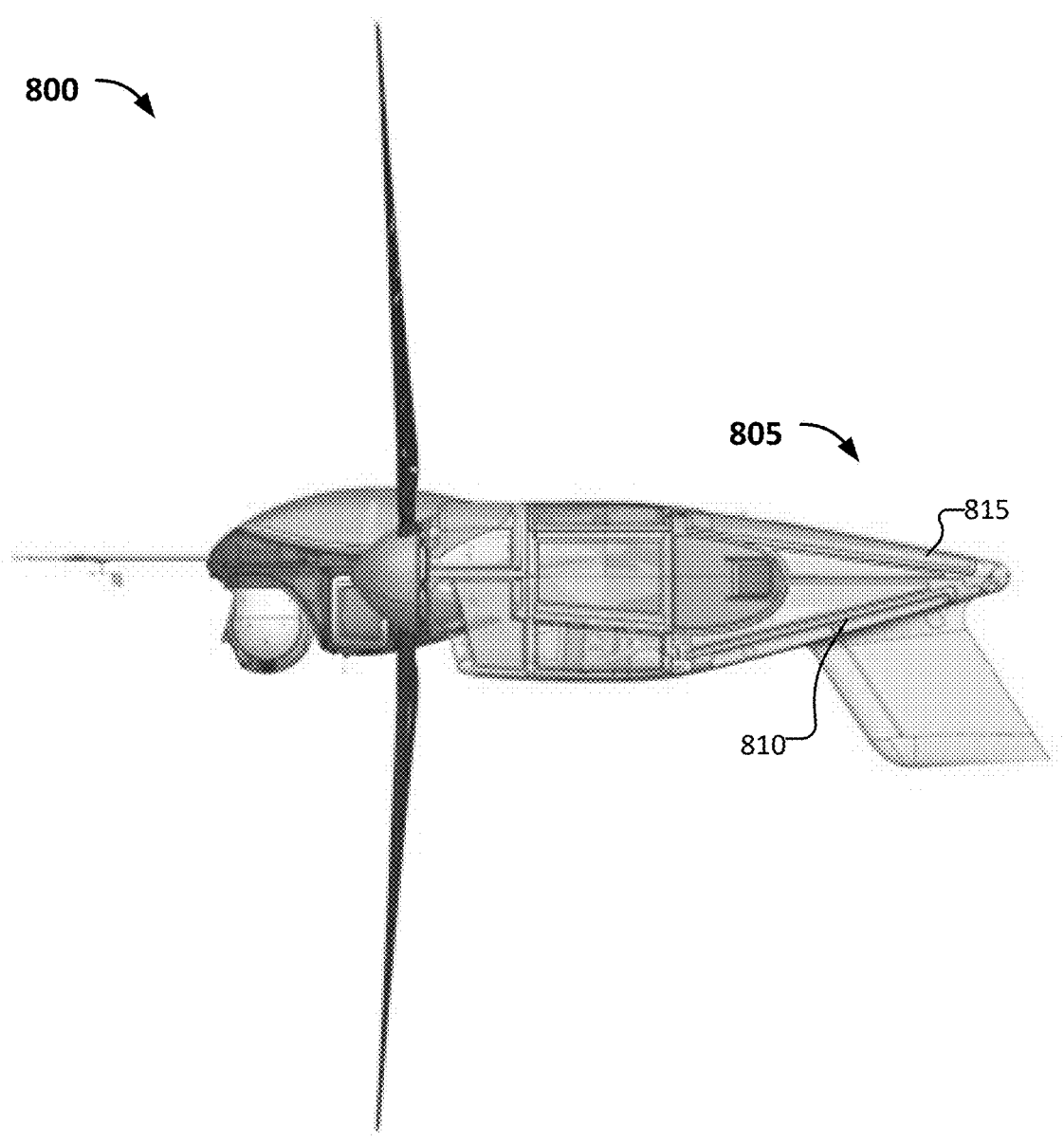
FIG. 8C is a side view of a landing gear system for an aircraft according to various embodiments.

FIG. 8C is a side view of a landing gear system for an aircraft according to various embodiments. In the example shown, aircraft 800 is illustrated in the configuration according to horizontal flight. As illustrated, landing gear system 805 is configured in a stowed or retracted state during horizontal flight. After take-off, landing gear system 805 is configured to actuate landing support members 810, 815 to stow landing support members 810, 815. During horizontal flight, landing support members 810, 815 are configured to be positioned in a manner that they have a collective profile that is aerodynamic/low-drag. In some embodiments, landing gear system 805 comprises an actuation system that has one or more actuators to control positioning of one or more of landing support members 810, 815.

Figure 9:
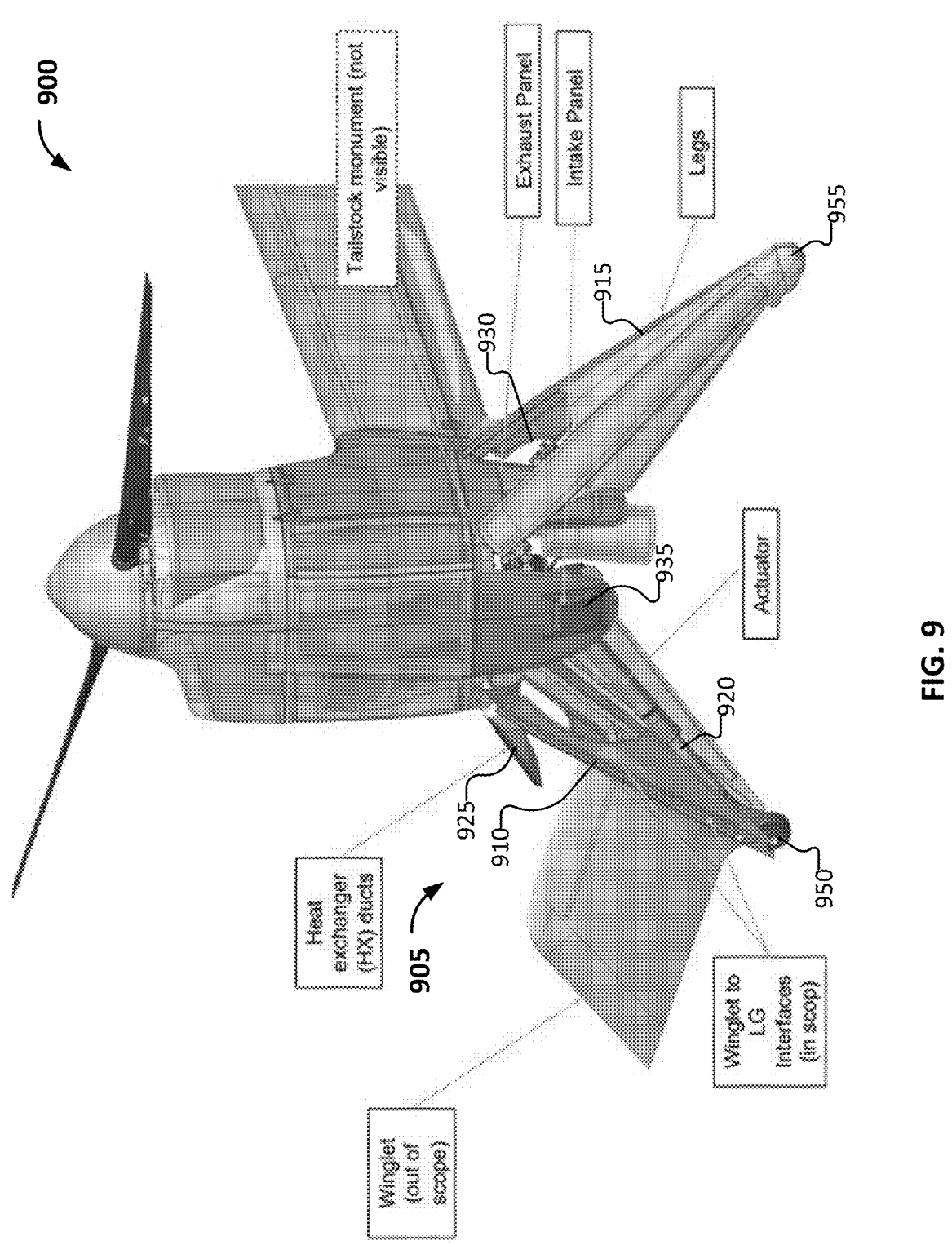
FIG. 9 is a diagram of a landing gear system according to various embodiments.

FIG. 9 is a diagram of a landing gear system according to various embodiments. As illustrated, aircraft 900 comprises landing gear system 905 comprising first landing support member 910 (e.g., a first leg) and second landing support member 915 (e.g., a second leg). The distal end of first landing support member 910 comprises foot 950 (e.g., a wheel), and the distal end of second landing support member 915 comprises foot 955 (e.g., a static/rigid foot). In some embodiments, landing gear system 905 is disposed at the aft of the nacelle (e.g., the left nacelle connected to the left wing in the example shown). Landing gear system 905 is illustrated in a deployed state.

In some embodiments, landing gear system 905 comprises an actuation system configured to actuate one or more of landing support members 910, 915. The actuation system controls one or more actuators to transition one or more of landing support members 910, 915 between a stowed state and a deployed state. The one or more actuators may comprise a linear actuator. The linear actuator is actuated to linearly extend to a deployed state and to retract to a stowed state. In the example shown, the actuation system comprises first actuator 920 that is configured to change a position of first landing support member 910. For example, first actuator 920 comprises a distal end that is connected to a distal end of first landing support member 910. First actuator 920 is controlled to extend an element of first actuator 920 to position first landing support member 910 to a deployed state and to retract to position first landing support member 910 to a stowed state.

The engines comprised in the nacelles generate exhaust or heat that is to be vented from the nacelle to the exterior environment. In some embodiments, landing gear system 905 is configured to define one or more venting pathways (e.g., an exhaust path). The one or more venting pathways may vent the exhaust or heat (e.g., an exhaust path) through the rear portion of the nacelle. In the case in which landing gear system 905 comprises a plurality of landing support members having a panel design, the one or more venting pathways may be defined to vent the exhaust or heat through one or more panels or through a space between the plurality of pathways.

In some embodiments, landing gear system 905 defines different pathways based on whether landing gear system 905 is configured in a stowed state or a deployed state. In some embodiments, when landing gear system 905 is configured in a stowed state, landing gear system 905 defines one or more venting pathways that vent the exhaust/heat via one or more landing support members 910, 915 (e.g., via a vent configured with respect to a panel of a landing support member). In some embodiments, when landing gear system 905 is configured in a deployed state, landing gear system 905 defines one or more venting pathways through the aft of landing gear system 905, such as via a void/space defined by the deployed landing support members 910, 915.

In the example shown, landing gear system 905 comprises one or more venting modules (e.g., venting modules 925, 930) that define at least a subset of the one or more venting pathways. A venting module may be a channel that directs the exhaust/heat from a venting interface of the nacelle (e.g., which receives heat from the engine). For example, landing gear system 905 comprises venting module 925 that directs heat from the nacelle/engine (e.g., a venting interface of the nacelle) to exit through a side of landing support member 910, such as through a panel of the panel design.

In some embodiments, the one or more venting modules are rotatably connected to landing gear system 905, such as to be able to pivot/rotate to different positions based on whether landing gear system 905 is in a deployed state or a stowed state. For example, when landing gear system 905 (e.g., a landing support member) is configured in the stowed state venting module 925 is configured in a position to receive exhaust/heat from the nacelle venting interface and to direct the exhaust/heat outside the side of landing support member 910. As another example, when landing gear system 905 is configured in the deployed state, venting module 925 is configured in a position in which it does not receive exhaust/heat from the nacelle venting interface and/or does not obstruct exhaust/heat flowing from the existing nacelle venting interface so that the exhaust/heat is emitted through the rear of landing gear system 905 via the space defined between landing support members 910, 915.

Landing gear system 905 may comprise one or more intake panels such as intake panel 935. The intake panel(s) is configured to receive a fluid (e.g., air) from the exterior environment and direct the fluid to an interior of the nacelle, such as to allow air to flow over the engine and carry heat out via a venting pathway.

Figure 10:
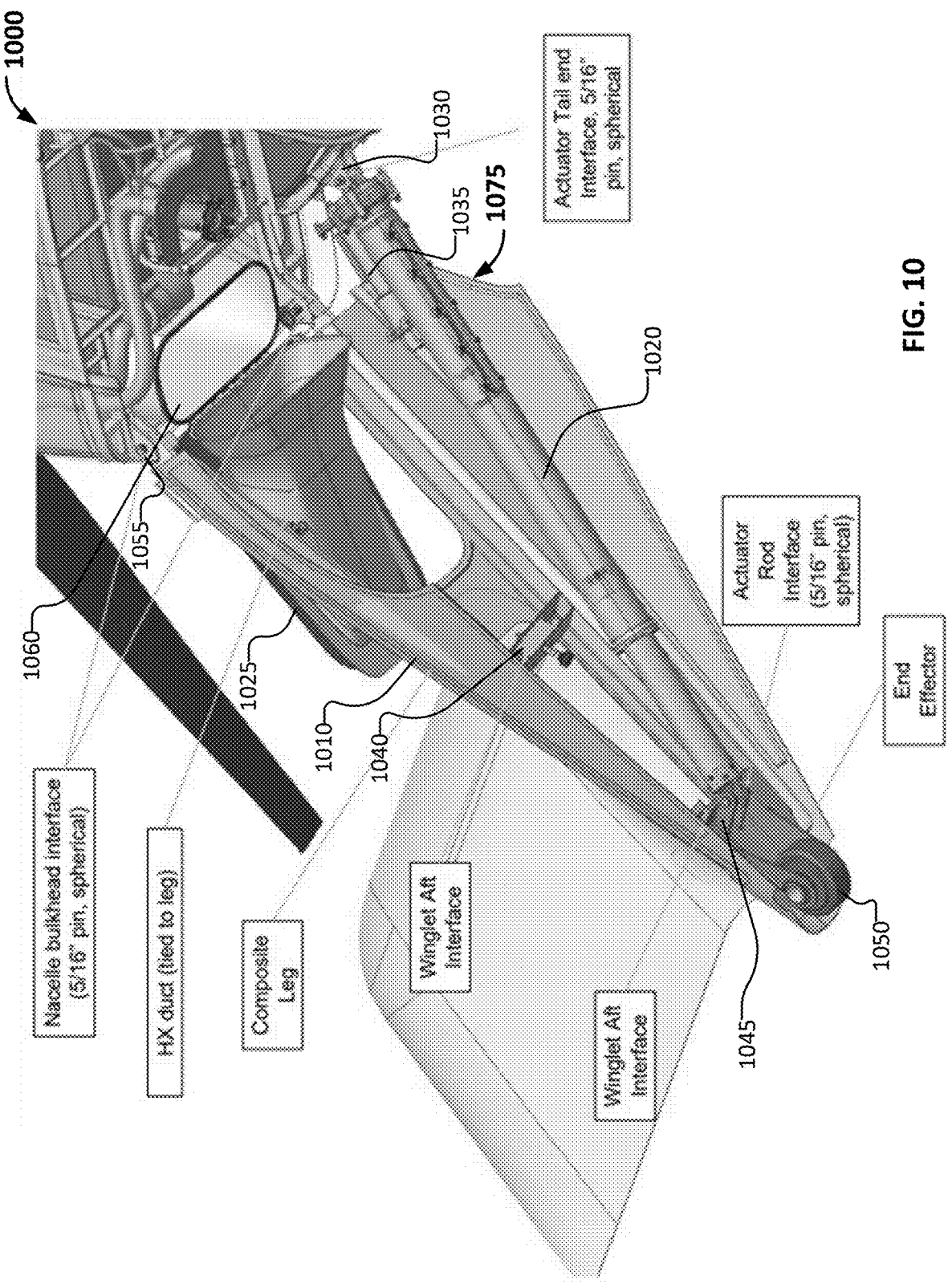
FIG. 10 is a diagram of a landing gear system according to various embodiments.

FIG. 10 is a diagram of a landing gear system according to various embodiments. In some embodiments, landing gear system 1000 comprises landing support member 1010 and actuator 1020 configured to move landing support member 1010 based on actuation of actuator 1020. The aircraft control system, or control system for landing gear system 1000, controls actuation of actuator 1020 based on a determination to configure landing gear system 1000 in a deployed state (e.g., in response to determining that the aircraft is to perform a landing operation) or a determination to configure landing gear system 1000 in a stowed state (e.g., in response to determining that the aircraft is to perform horizontal slight).

In some embodiments, actuator 1020 is a linear actuator. When landing support member 1010 is to be configured in a deployed state, the linear actuator is controlled to extend and thus move (e.g., push) landing support member 1010 to the deployed state. As an example, the linear actuator is connected to landing support member 1010 via actuator interface 1045, and thus as the linear actuator is extended or retracted, the linear actuator causes landing support member 1010 to correspondingly move. Actuator interface 1045 may be a pin that couples hole(s) in the distal end of actuator 1020 (e.g., the linear actuator rod) and hole(s) in a mounting at the distal end of landing support member 1010.

As the linear actuator extends, actuator 1020 applies a force on landing support member 1010 to push landing support member 1010 to rotate around an axis in connection with moving landing support member 1010 to a deployed state. Conversely, as the linear actuator retracts, actuator 1020 applies a force on landing support member 1010 to pull landing support member 1010 to rotate around an axis in connection with moving landing support member 1010 to a stowed state. As an example, the axis around which landing support member 1010 rotates to move between the stowed state and the deployed state is defined based at least in part on a set of one or more couplings (e.g., coupling 1055) between landing support member 1010 and the nacelle.

Landing support member 1010 is rotatably connected to the nacelle. For example, the aircraft comprises a hinge defined by a set of couplings between landing support member 1010 and the nacelle. A coupling in the set of couplings (e.g., coupling 1055) may comprise a pin, bolt, or other mechanism that couples landing support member 1010 to the nacelle and defines an axis around which landing support member 1010 rotates with respect to the nacelle.

Landing gear system 1000 comprises an actuation system 1075 for controlling positioning of landing support member 1010. The actuation system 1075 may comprise actuator 1020 that is connected to landing support member 1010 and the nacelle. For example, a distal end of actuator 1020 is connected to landing support member 110 via actuator interface 1045. As another example, a proximal end of actuator 1020 is connected to the nacelle via actuator tail end interface 1030. The actuation system 1075 further comprises a mechanism for driving actuation of actuator 1020. For example, the actuation system comprises motor module 1035. Motor module 1035 is controlled to cause actuation of actuator 1020, such as to control a linear actuator to extend/retract based on whether landing gear system 1000 is to be configured in a stowed state or deployed state. In some embodiments, motor module 1035 comprises a solenoid that is driven via a control signal and causes actuation of the linear actuator.

The actuation system 1075 may additionally comprise a control system, such as a controller that provides to motor module 1035 a control signal. Additionally, or alternatively, the actuation system 1075 may be controlled by an aircraft control system. For example, a local controller comprised in the actuation system 1075 may receive a high-level instruction from the aircraft control system (e.g., an indication to configure landing gear system 1000 in the deployed state or an indication to configure landing gear system 1000 in the stowed state), and then generate a lower-level instruction to control elements within the actuation system 1075 (e.g., motor module 1035, a brake system, etc.). As another example, the aircraft control system provides the low-level instruction directly to the elements within the actuation system (e.g., the aircraft control system is connected to motor module 1035 without an intermediary controller, etc.).

In some embodiments, landing gear system 1000 comprises one or more venting modules, such as venting module 1025. Venting module 1025 is configured to receive exhaust/heat from nacelle venting interface 1060 and redirect the exhaust/heat from the interior of the nacelle (e.g., from nacelle venting interface 1060) to the exterior environment. For example, venting module 1025 receives the exhaust/heat and causes the exhaust/heat to be vented out the side of landing support member 1010. Landing support member

1010 may have a cutout or a profile at which venting module 1025 is disposed or via which venting module 1025 emits the exhaust/heat.

According to various embodiments, a venting module (e.g., venting module 1025) is movably connected to the nacelle or landing gear system 1000. In the example shown, venting module 1025 is rotatably connected to the nacelle or landing gear system 1000. Venting module 1025 is configured to receive exhaust/heat from nacelle venting interface 1060 when landing gear system 1000 is configured in the stowed state (e.g., because there is not sufficient space between the landing support member to vent air from the center aft). Venting module 1025 is further configured to be rotated in a manner that venting module 1025 is moved to no longer obstruct a venting pathway of exhaust/heat being carried by nacelle venting interface 1060. In some embodiments, landing gear system 1000 comprises one or more venting module actuators that control positioning of the venting module(s), such as based on whether landing gear system 1000 is in a deployed state or a stowed state. In various other embodiments, the venting module(s) is connected to a landing support member and as the landing support member is moved between the deployed state and the stowed state the venting module is correspondingly moved.

The landing support member of landing gear system 1000 comprises an end effector at its distal end. The end effector may be a rigid foot (e.g., a cap that covers the distal end of the landing support member), a wheel, etc. In the example shown, landing support member 1010 has wheel 1050 at its distal end.

In some embodiments, landing support member 1010 comprises one or more interfaces to which a winglet is connected. For example, landing gear system 1000 comprises a winglet after interface 1040 to which the winglet for the wing is mounted.

Figure 11A:
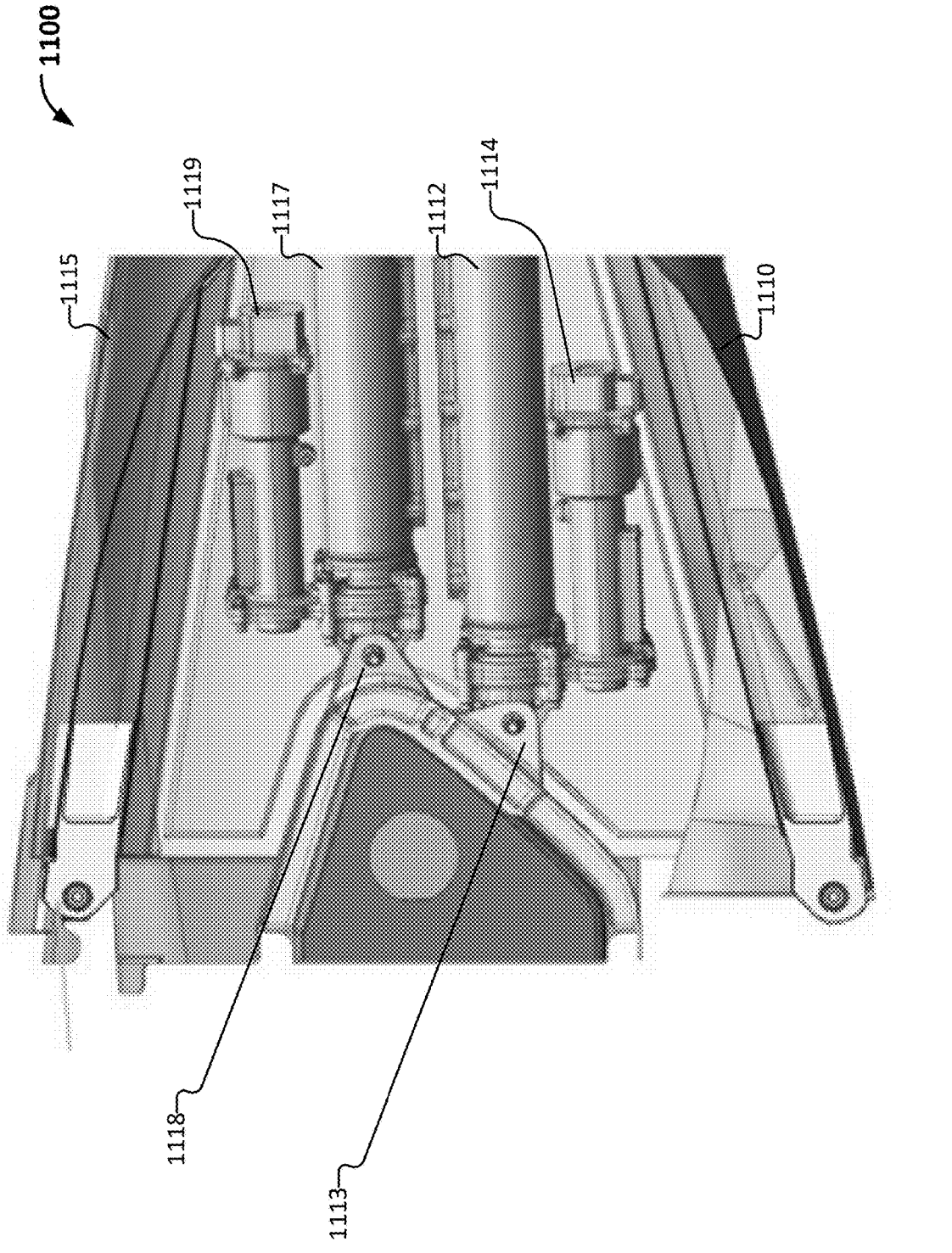
FIG. 11A is a diagram of an actuation system for an aircraft landing gear system according to various embodiments.
Figure 11B:
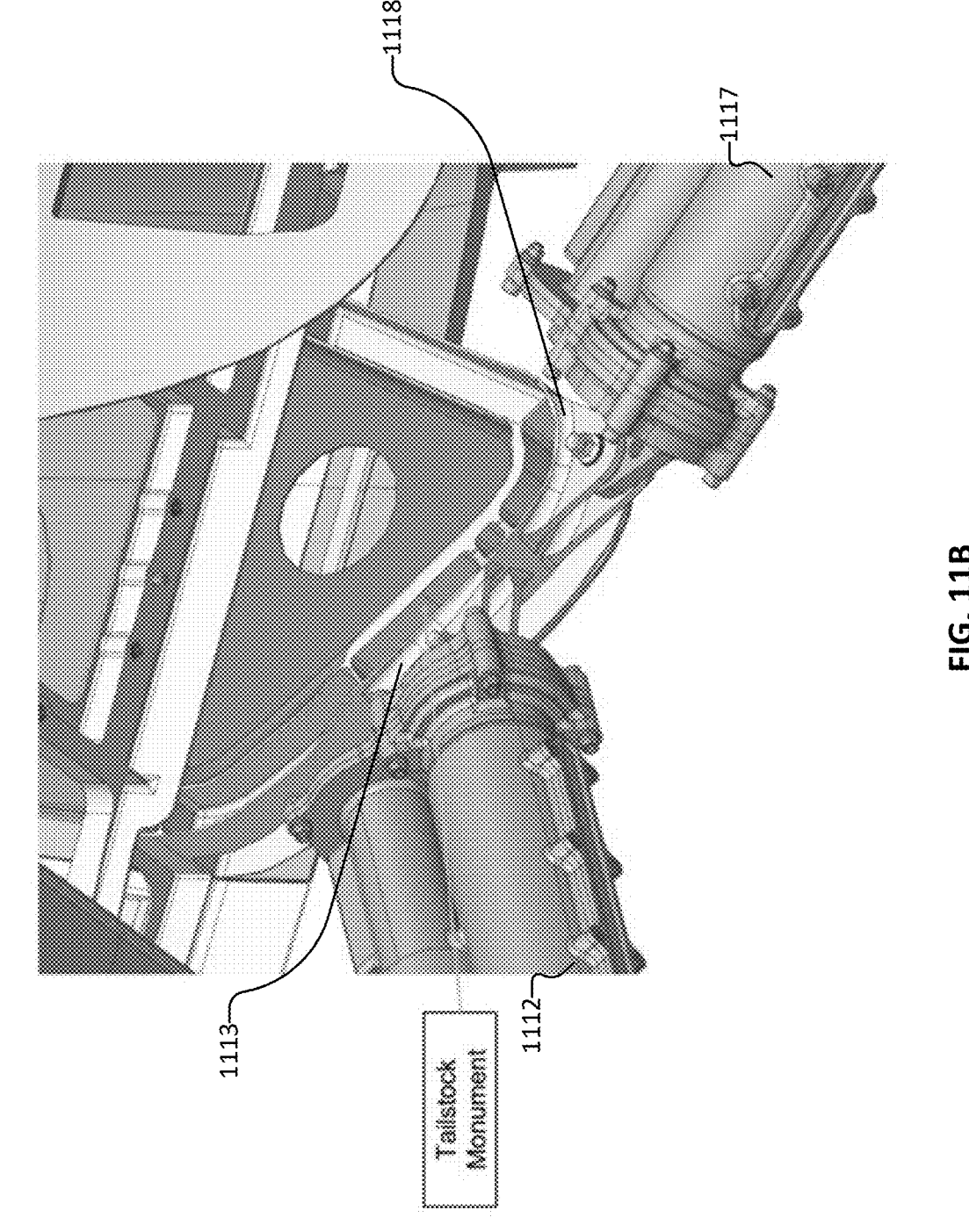
FIG. 11B is a diagram of an actuation system for an aircraft landing gear system according to various embodiments.

FIGS. 11A and 11B are diagrams of an actuation system for an aircraft landing gear system according to various embodiments. In the example shown, actuation system 1100 comprises one or more actuators such as actuators 1112, 1117, which are controlled to respectively move landing support member 1110 and landing support member 1115. Actuators 1112, 1117 may be linear actuators that respectively extend and retract based on whether the landing gear system is to be configured in a deployed state or a stowed state.

Actuators 1112, 1117 are respectively connected to the nacelle (e.g., a nacelle tailstock) via actuator tail end interfaces 1113, 1118. In some embodiments, an actuator (e.g., actuator 1112, 1117) is rotatably connected to the nacelle tailstock. For example, the actuator tail interface that connects the actuator to the nacelle tailstock serves as a hinge to allow the actuator to rotate relative to a defined axis (e.g., an axis defined by a pin, bolt, or other coupling that couples the actuator to the actuator tail interface) as the actuator is actuated and the landing support member is correspondingly moved between the deployed state and the stowed state. In the example shown in FIG. 11A, the landing gear system (e.g., landing support members 1110, 1115) are configured in the stowed state. In contrast, in the example shown in FIG. 11B, the aircraft landing gear system is configured in a deployed state. As illustrated in FIG. 11B, actuators 1112, 1117 have rotated relative to the nacelle tailstock as the landing support members are moved to the deployed state.

Actuation system 1100 further comprises one or more mechanisms for driving actuation of actuators 1112, 1117. For example, actuation system 1100 comprises motor module 1114 that is controlled to actuate actuator 1112 and cause landing support member 1110 to move between the deployed state and the stowed state. Motor module 1114 may comprise a motor and/or a braking mechanism. Similarly, actuation system 1100 comprises motor module 1119 that is controlled to actuate actuator 1117 and move landing support member 1115 between the deployed state and the stowed state.

Figure 12:
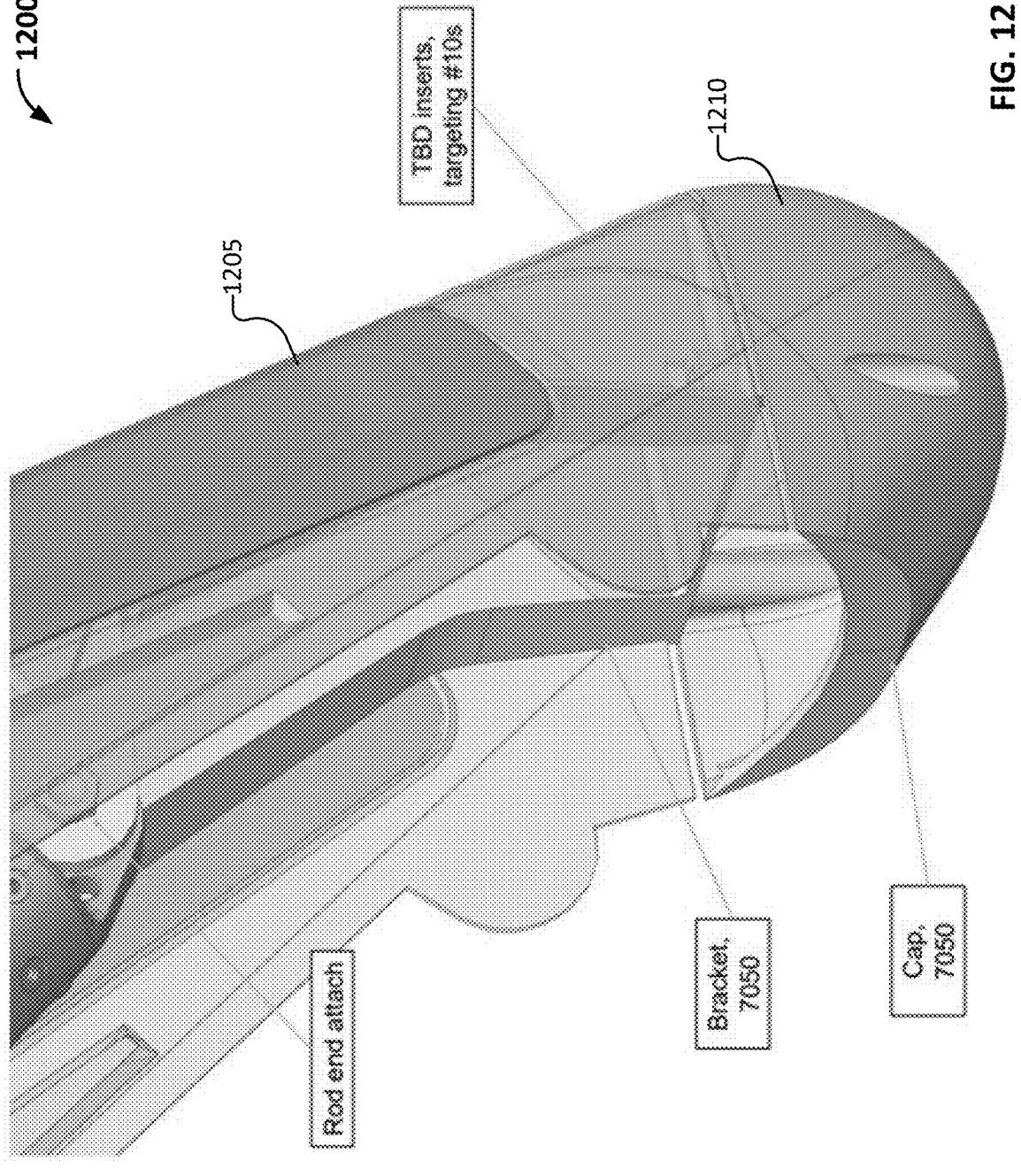
FIG. 12 is a diagram of a foot for a leg in a landing gear system according to various embodiments.

FIG. 12 is a diagram of a foot for a leg in a landing gear system according to various embodiments. Landing gear system 1200 comprises landing support member 1205. In the example shown, a close-up of a distal region of landing support member 1205 is provided. The distal end of landing support member 1205 terminates in an end effector 1210. For example, end effector 1210 is connected to landing support member 1205 to protect landing support member 1205 during landing. Various types of end effectors may be implemented as feet for the landing support member, such as a wheel, a cap, etc. In the example shown, end effector 1210 is a cap.

In some embodiments, end effector 1210 serves to provide a wearable impact location for the landing module. End effector 1210 and/or the connection between end effector 1210 and landing support member 1205 is configured to be removable, such as for replacement of the end effector due to wear and tear. In the case of end effector 1210 being a cap, the cap may be made from plastic.

Figures 13A, 13B:
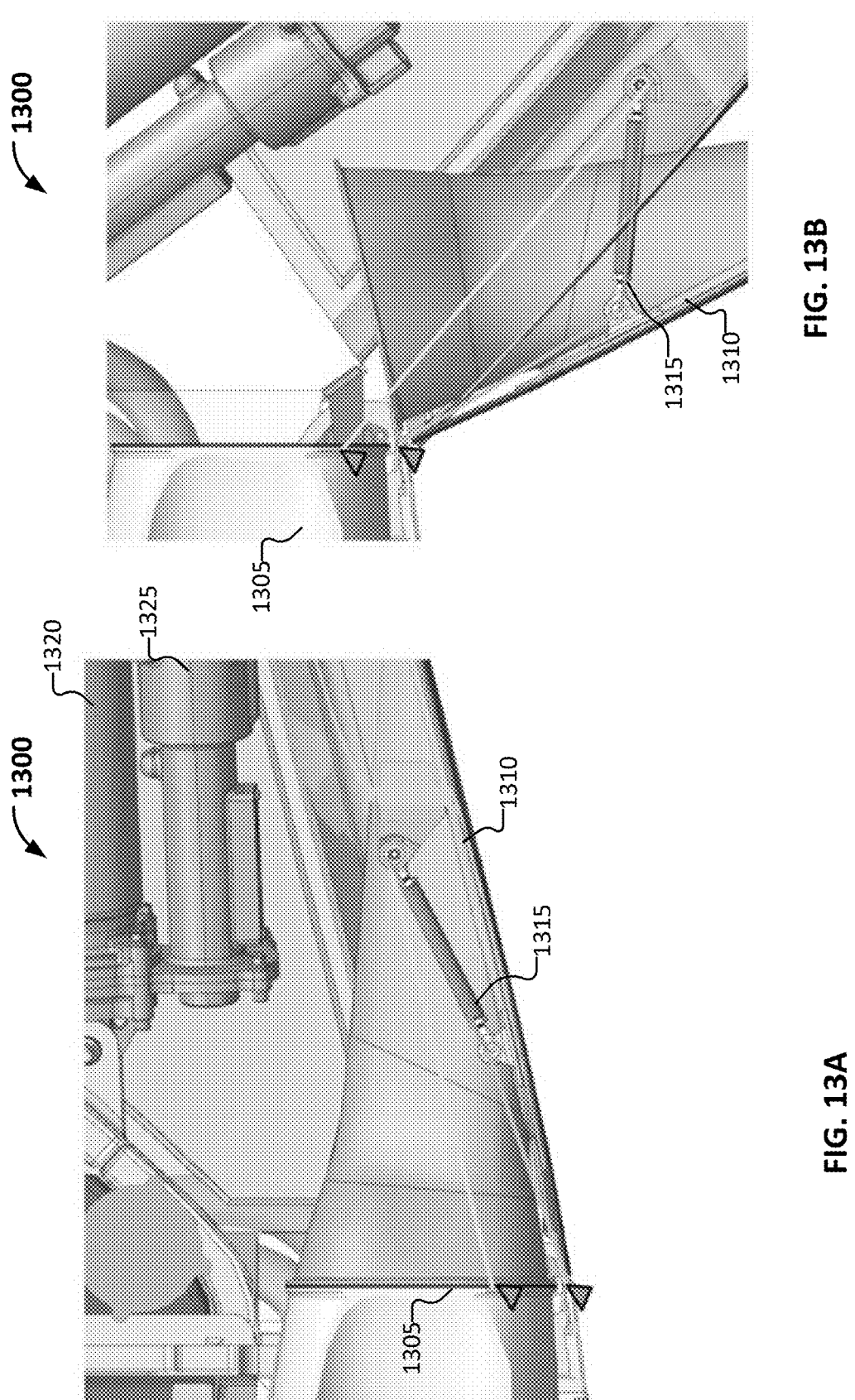
FIGS. 13A and 13B illustrate a venting system for an aircraft according to various embodiments.

FIGS. 13A and 13B illustrate a venting system for an aircraft according to various embodiments. In the example shown, venting system 1300 comprises a venting module 1310 that vents exhaust/heat from nacelle venting interface 1305 at least when the landing gear system is configured in the stowed state. The landing gear system controls motor module 1325 to drive actuator 1320. Actuator 1320 may be a linear actuator and actuation of actuator 1320 causes the linear actuator to extend or retract, which in turn causes the landing support member to move between a deployed state and a stowed state.

The example shown in FIG. 13A illustrates the configuration of venting module 1310 when the landing gear module is in the stowed state (e.g., when the landing support member via which venting module 1310 vents the exhaust/heat). When the landing gear module is in the stowed state, venting module 1310 is positioned to receive exhaust/heat from nacelle venting interface 1305. For example, venting module 1310 is a channel or duct that redirects exhaust/heat flowing from nacelle venting interface to the exterior environment.

The example shown in FIG. 13B illustrates the configuration of venting module 1310 when the landing gear module is in the deployed state. When the landing gear module is in the deployed state, the exhaust/heat generated by the engine is vented through the rear of the landing gear module, such as through the space created by the deploying of the landing support members. Venting module 1310 is moved (e.g., rotated) in a manner that venting module 1310 does not obstruct or interfere with the exhaust/heat being emitted from nacelle venting interface 1305.

In some embodiments, venting module 1310 is connected to the landing support member via tie rod 1315.

Figure 14:
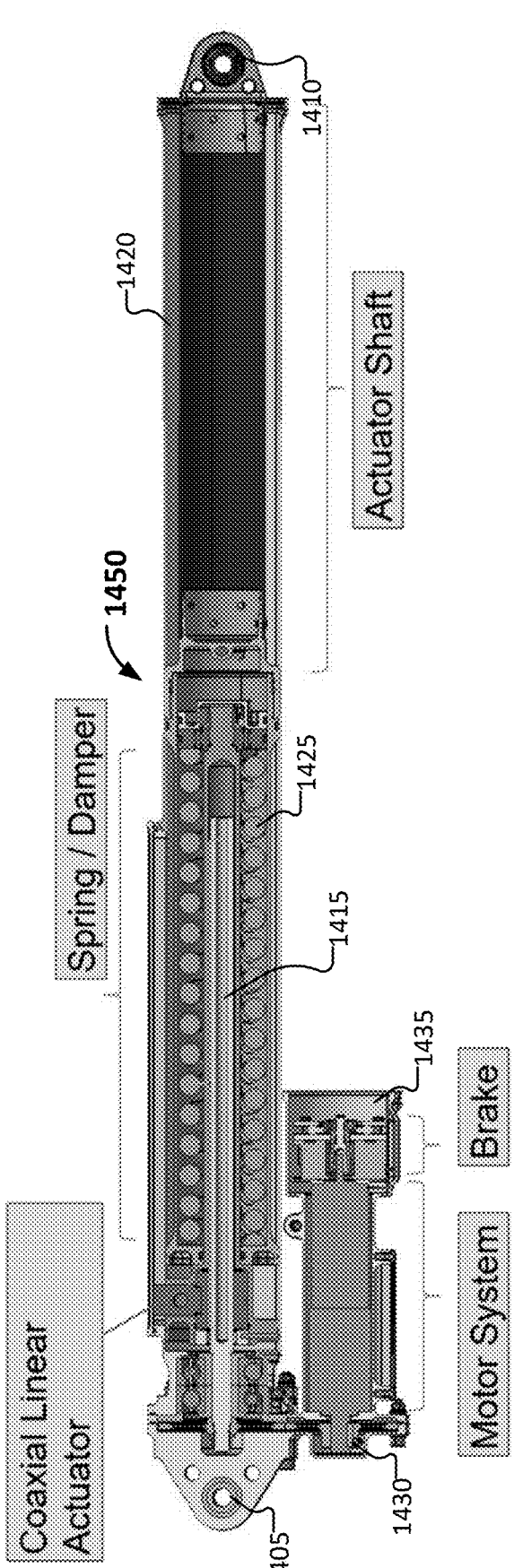
FIG. 14 illustrates an actuator according to various embodiments.

FIG. 14 illustrates an actuator according to various embodiments. In some embodiments, an aircraft landing gear system comprises an actuation system, such as actuation system 1400. Actuation system 1400 comprises an actuator 1450 that is controlled by a control system (e.g., a central aircraft control system, or a control system local to the actuation system or landing module). In response to actuator 1450 being actuated, the actuator 1450 causes the landing module to transition between a deployed state and a stowed state. For example, actuator 1450 causes a landing support member to move between the deployed state and the stowed state.

In some embodiments, actuation system 1400 comprises a shock absorption mechanism. The shock absorption mechanism may be a spring. In some embodiments, the shock absorption mechanism is comprised in actuator 1450. For example, actuator 1450 comprises a damper 1425. Damper 1425 may be a spring, an air piston dampener, or various other types of dampener. In some implementations, if actuator 1450 comprises a linear actuator, as shown in FIG. 14, damper 1425 may be disposed around the linear actuator 1415. For example, a spring (e.g., damper 1425) is positioned around (e.g., wrapped around) linear actuator 1415 to provide a compact mechanism for absorbing shocks translated to actuation system 1400 (e.g., during a landing operation). Damper 1425 provides a give to the landing module as the landing support members engage the ground as the aircraft is landing.

In the example shown, actuation system 1400 comprises actuator 1450, motor system 1430, and brake system 1435. Further, actuation system 1400 further comprises a proximal coupling interface 1405 and a distal coupling interface 1410. In some embodiments, proximal coupling interface 1405 is connected to the nacelle, such as to a nacelle tailstock. Conversely, distal coupling interface 1410 may be connected to a corresponding landing support member. For example, distal coupling interface 1410 is connected to a distal portion of the landing support member so that as linear actuator 1415 is actuated to cause actuator shaft 1420 to extend the distal coupling interface 1410 translates a force to push the landing support member.

Motor system 1430 is driven to actuate linear actuator 1415, which may be a coaxial linear actuator. In some embodiments, linear actuator 1415 is located interior to damper 1425. In some embodiments, linear actuator 1415 is located exterior to damper 1425. Linear actuator 1415 may be connected to actuator shaft 1420 via a threaded connection and retaining nut. As linear actuator 1415 is actuated in connection with configuring the landing gear system in a deployed state, linear actuator 1415 causes actuator shaft 1420 to extend (e.g., thereby applying a pushing force on the landing support member). Conversely, as linear actuator 1415 is actuated to configure the landing gear system in a stowed state, linear actuator 1415 causes actuator shaft 1420 to retract (e.g., thereby applying a pull force on the landing support member).

Figure 15:
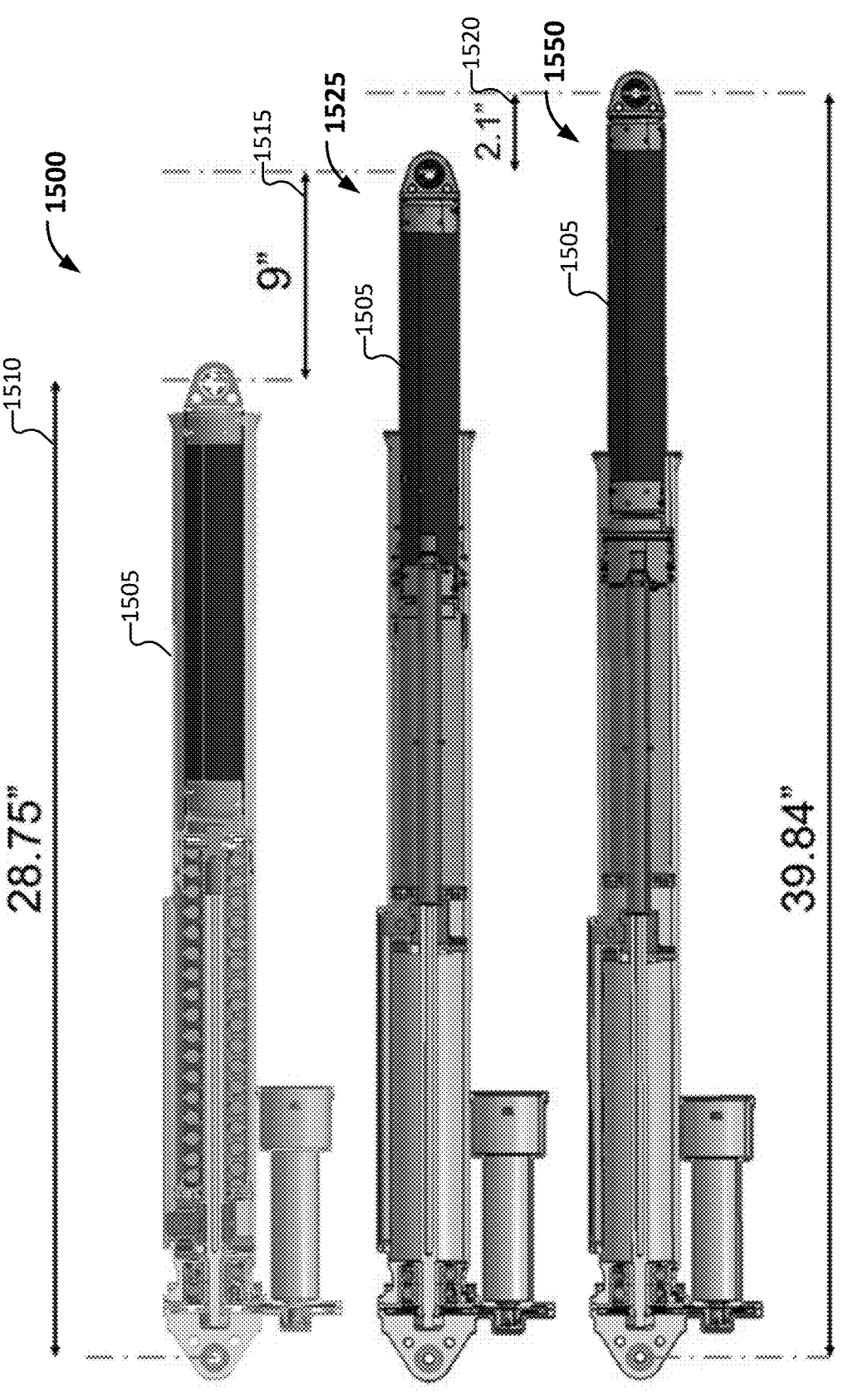
FIG. 15 illustrates an actuator according to various embodiments.

FIG. 15 illustrates an actuator according to various embodiments. As illustrated, actuator 1505 is in a stowed state 1500, a deployed state 1525, and a deployed+shock state 1550 (e.g., a state in which the actuation system is under shock, such as during the aircraft landing). In the example shown, deployed+shock state 1550 corresponds to a maximum travel length for actuator 1505.

In stowed state 1500, actuator 1505 has a stowed length 1510 (e.g., a second length). In the example shown, stowed length 1510 is 28.75 inches. In the deployed state 1525, actuator 1505 is extended to a deployed length 1515 (e.g., a first length). As shown, deployed length 1515 is greater than stowed length 1510. For example, deployed length 1515 is 9 inches longer than stowed length 1510. In the deployed+ shock state 1550, actuator 1505 has a maximum travel length 1520. The maximum travel length 1520 is longer than deployed length 1515. For example, maximum travel length 1520 is about 2.1 inches longer than deployed length 1515.

In some embodiments, in the case of a linear actuator, the linear actuator is configured to have a maximum travel length that is at least 35% longer than the second length. The linear actuator is configured to have a maximum travel length that is at least five percent longer than the first length.

In some embodiments, the linear actuator is configured to have a first length (e.g., deployed length 1515) when the first actuator is in the deployed state, and a second length (e.g., stowed length 1510) when the first actuator is in a retracted state. The first length is at least 25% longer than the second length.

Figure 16:
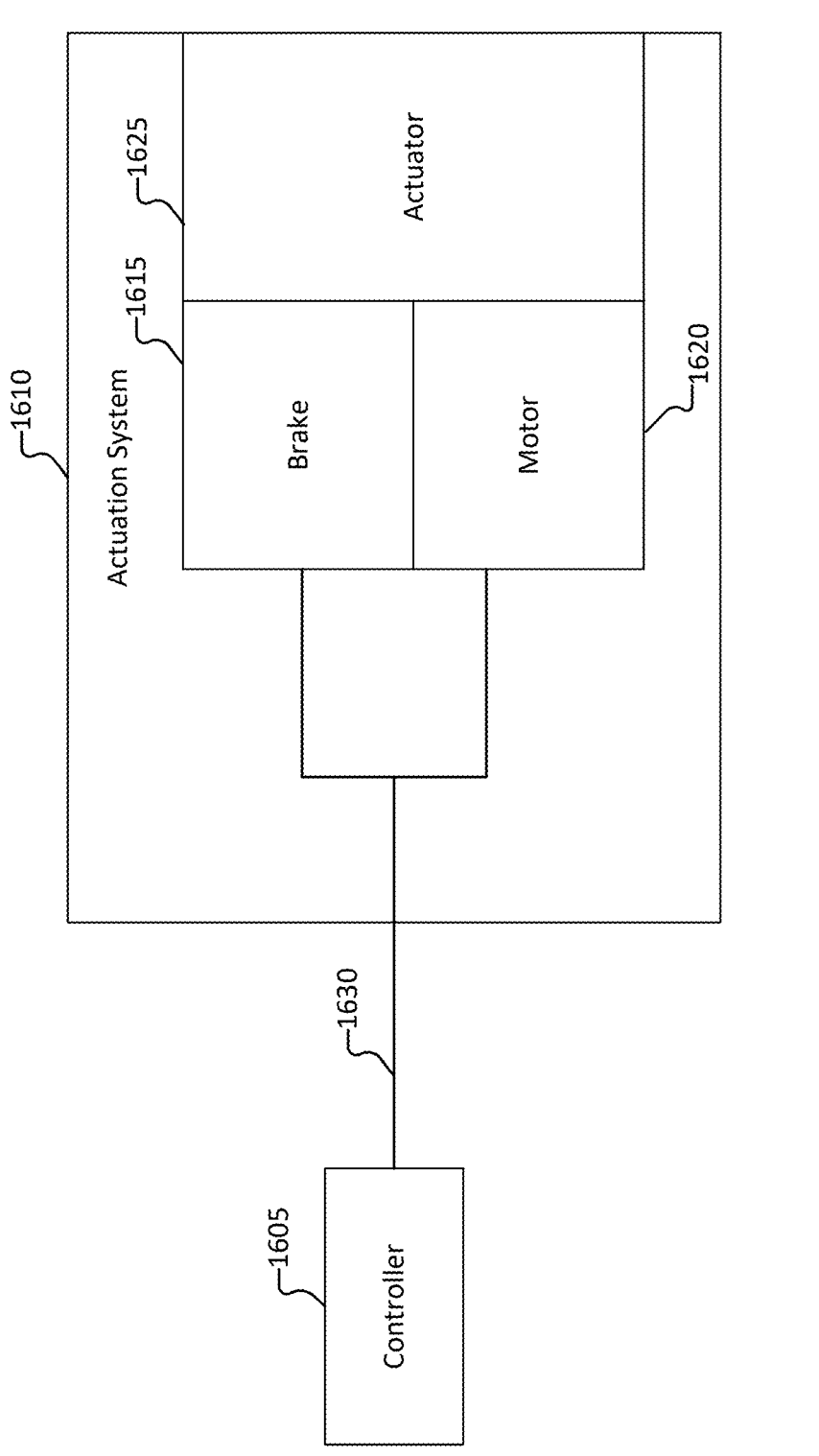
FIG. 16 illustrates an actuation system and control system for controlling the actuation system according to various embodiments.

FIG. 16 illustrates an actuation system and control system for controlling the actuation system according to various embodiments. In some embodiments, the aircraft comprises controller 1605 and actuation system 1610. Controller 1605 may be the aircraft control system which generally controls the various aircraft systems, such as driving the engines, redistributing fuel within the aircraft, providing the engines with fuel, take-off and landing control, flight control, collecting sensor data, delivering a payload, etc. Additionally, or alternatively, controller 1605 may be comprised in actuation system 1610.

In the example shown, actuation system 1610 comprises motor module 1620, brake module 1615, and actuator 1625. Actuation system 1610 uses a control signal, such as a signal received via connection 1630 from controller 1605, to control actuation of actuator 1625 and configuration of the landing module between a deployed state and a stowed state. For example, actuation system 1610 controls to actuate actuator 1625 to transition the landing module (e.g., a landing support member) from a deployed state to a stowed state, such as in connection with operating in horizontal flight. As another example, actuation system 1610 controls to actuate actuator 1625 to transition the landing module (e.g., the landing support member) from a stowed state to a deployed state, such as in connection with performing a landing operation.

In some embodiments, actuator 1625 controls actuation of actuator 1625 based on driving the brake module 1615 or the motor module 1620. Actuation system 1610 drives motor module 1620 to actuate actuator 1625, such as to extend or retract a linear actuator connected to a landing support member. Actuation system 1610 uses brake module 1615 to stop/prevent further actuation of actuator 1625, such as to hold landing module in the deployed state or stowed state, as applicable.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
a first wing and a second wing;
a fuselage disposed between the first wing and the second wing;
a first landing gear system disposed at an aft of the aircraft, wherein the first landing gear system comprises a first leg and a second leg that are configured to at least partially rotate around an axis defined by a length of the first wing when the first leg and the second leg are able to be transitioned to a deployed state or to a stowed state; and
a first engine system operatively mounted to the first wing, the first engine system comprising a first nacelle, and the first landing gear system disposed at an aft of the first nacelle, wherein the first leg comprises a first housing comprising a first vent configured to vent exhaust from a first engine of the first engine system when the first leg is in the stowed state.

2. The aircraft of claim 1, wherein the first landing gear system comprises two v-shaped actuators that are configured to transition the first leg and the second leg to the stowed state or the deployed state.

3. The aircraft of claim 1, further comprising:
a second engine system operatively mounted to the second wing; and
a second landing gear system disposed at the aft of the aircraft.

4. The aircraft of claim 3, wherein:
the second engine system comprises a second nacelle; and
the second landing gear system is disposed at an aft of the second nacelle.

5. The aircraft of claim 4, wherein the first engine system and the second engine system are used for both (i) vertical take-off and landing, and (ii) horizontal flight.

6. The aircraft of claim 1, wherein the first leg and the second leg are configured to split apart when the first landing gear system is in the deployed state.

7. The aircraft of claim 6, wherein the first leg and the second leg are hingedly connected to the first nacelle.

8. The aircraft of claim 6, wherein the first landing gear system comprises one or more winglets disposed on the first leg or the second leg.

9. The aircraft of claim 6, wherein the first leg and the second leg are configured to bear a weight of the aircraft when the first landing gear system is in the deployed state.

10. The aircraft of claim 6, wherein a distal end of the first leg comprises a foot that is configured to be removably mounted to the first leg.

11. The aircraft of claim 6, wherein the first leg and the second leg are split apart by at least a threshold distance when the first landing gear system is in the deployed state.

12. The aircraft of claim 6, wherein:
the first leg comprises a foot disposed at a distal end of the first leg; and
the second leg comprises a wheel disposed at a distal end of the second leg.

13. The aircraft of claim 6, wherein the first landing gear system comprises a first actuator that is configured to transition the first leg to the deployed state or the stowed state.

14. The aircraft of claim 13, wherein the first landing gear system has an aerodynamic profile when the first leg and the second leg are in the stowed state.

15. The aircraft of claim 13, wherein the first actuator is a linear actuator.

16. The aircraft of claim 15, wherein the first actuator comprises a damper.

17. The aircraft of claim 1, wherein the first vent is moved out of an exhaust path of exhaust when the first leg is in the deployed state.

18. The aircraft of claim 17, wherein the exhaust is vented along a path in an opening between the first leg and the second leg when the first landing gear system is in the deployed state.

* * * * *